US007855797B2

(12) United States Patent
Okada

(10) Patent No.: US 7,855,797 B2
(45) Date of Patent: Dec. 21, 2010

(54) NETWORKED IMAGE FORMING SYSTEM, INCLUDING PROCESSING CONTROLLER, IMAGE FORMING APPARATUS, AND PRINTER DRIVER PROGRAM FOR USE THEREIN

(75) Inventor: Mikiya Okada, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1099 days.

(21) Appl. No.: 11/439,715

(22) Filed: May 23, 2006

(65) Prior Publication Data

US 2006/0268335 A1 Nov. 30, 2006

(30) Foreign Application Priority Data

May 24, 2005 (JP) .............................. 2005-151212

(51) Int. Cl.
*G06F 3/12* (2006.01)
*G06K 15/00* (2006.01)
(52) U.S. Cl. ..................................... 358/1.15; 358/1.13
(58) Field of Classification Search .................. 358/1.1, 358/1.8, 1.9, 1.13, 1.14, 1.15, 1.18, 474, 358/400, 468; 709/201, 202, 203, 212, 213, 709/220, 238, 242
See application file for complete search history.

(56) References Cited

U.S. PATENT DOCUMENTS 7,180,623 B2 * 2/2007 Kato ......................... 358/1.15
2002/0159092 A1 * 10/2002 Christodoulou et al. .... 358/1.15

FOREIGN PATENT DOCUMENTS

| JP | 11-203082 | 7/1999 |
| JP | 2002-342055 | 11/2002 |
| JP | 2004-291629 | 10/2004 |

* cited by examiner

*Primary Examiner*—Gabriel I Garcia
(74) *Attorney, Agent, or Firm*—Edwards Angell Palmer & Dodge LLP; David G. Conlin; David A. Tucker

(57) ABSTRACT

An image forming system providing a plurality of image forming apparatuses and a processing controller for selecting at least one of the apparatuses and causing the selected apparatus to perform image formation, the plurality of image forming apparatuses and the processing controller being connected to one another through a network, wherein each of the image forming apparatuses includes an other-apparatus information storage section for storing information about one or more other image forming apparatuses as other-apparatus information, and the processing controller includes: an information acquiring section for acquiring the other-apparatus information stored in the other-apparatus information storage section of the selected apparatus through the network; a distributed-processing determination section for determining at least one of the one or more other apparatuses to be used for image formation in cooperation with the selected apparatus or determining that only the selected apparatus should be used for image formation, on the basis of the acquired other-apparatus information; and a commanding section for commanding the corresponding image forming apparatus(es) to perform the image formation, on the basis of the determination made by the distributed-processing determination section.

14 Claims, 15 Drawing Sheets

FIG.8

|  | OWN APPARATUS | OTHER APPARATUS |
|---|---|---|
| IP ADDRESS | 192.168.0.32 | 192.168.0.99 |
| SUBNET MASK | 255.255.255.0 | 255.255.255.0 |
| DEFAULT GATEWAY | 192.168.0.2 | 192.168.0.2 |
| INSTALLATION POSITION | *** SALES DEPARTMENT | *** SALES DEPARTMENT |
| MAKER | XYZ Corporation | XYZ Corporation |
| MODEL NUMBER | AR-123 | AR-123 |
| PRINT SPEED | 45 PRINTS/MIN | 45 PRINTS/MIN |
| STATE | STANDBY | STANDBY |
| DUPLEX FUNCTION | AVAILABLE | UNAVAILABLE |
| FINISHING FUNCTION | STAPLE AVAILABLE | NO-STABLE NEEDLE NOT PERMITTED |
| FIRST TRAY | A4 NEW PAPER | A4 NEW PAPER |
| SECOND TRAY | B5 : NEW PAPER | B5 : RECYCLED PAPER |
| THIRD TRAY | B4 : NEW PAPER | B4 : RECYCLED PAPER |
| FOURTH TRAY | A4 : INCLUDING LOGO | — |
| MANUAL TRAY | A4 : RECYCLED PAPER | A4 : NEW PAPER |
| TANDEM PROCESSING | PERMITTED | PERMITTED |

NETWORKED IMAGE FORMING SYSTEM, INCLUDING PROCESSING CONTROLLER, IMAGE FORMING APPARATUS, AND PRINTER DRIVER PROGRAM FOR USE THEREIN

CROSS-REFERENCE TO RELATED APPLICATION

This application is related to Japanese Patent Application No. 2005-151212 filed on May 24, 2005, whose priority is claimed and the disclosure of which is incorporated by reference in its entirety.

BACKGROUND OF THE INVENTION

1. Field of the Invention

The present invention relates to an image forming system, a printer driver program, a processing controller and an image forming apparatus, and more particularly, to an image forming system capable of distributing image forming processing into a plurality of image forming apparatuses, a printer driver program adaptable to the aforementioned image forming systems, a processing controller adaptable to the aforementioned image forming system, an image forming apparatus adaptable to the aforementioned image forming system or an image forming commanding method.

Further, the present invention relates to a processing controller, an image forming apparatus and an image forming commanding methods.

2. Description of the Related Art

There have been known methods for distributing image forming processing to a plurality of image forming apparatuses connected to one another through a network or the like for realizing parallel processing, so-called tandem processing (for example, refer to Japanese Unexamined Patent Application No. 11-203082). Such tandem processing can shorten the time required for performing image forming processing.

The procedure for performing tandem processing with image forming apparatuses having such a tandem processing function is as follows, for example.

First, there will be described a tandem copying processing which is performed by a plurality of image forming apparatuses as copiers using the tandem processing function. On an operation panel of one of the copiers, a user selects a tandem function prepared as one of copying functions and then starts copying processing. Then, the copier reads the document images and performs copying processing while the document images are transferred to other copier which is intended to perform distributed processing. Then, the image forming apparatuses perform copying processing in parallel and output copies.

Next, there will be described a tandem printing processing which is performed by a plurality of image forming apparatuses as printers. On a driver screen of a host, a user selects a tandem function prepared as one of the printing functions, a main printer and a sub printer and starts printing processing. On receiving a command and data from the host, the main printer performs printing while the print data is also transferred to the sub printer which is intended to perform distributed processing. Then, the printers perform printing processing in parallel.

Whether or not tandem processing should be performed is determined on the basis of an explicit command from a user who intends to start copying or printing processing. However, if there are many items for setting copying or printing functions, a tandem-function setting menu is provided at a deeper level in the menu hierarchy, in many cases. In such cases, the tandem processing function can not be easily used by the user. Therefore, even though such a tandem function is provided, effective utilization of the function can not be expected.

Furthermore, even if the user explicitly selects the tandem function, the image forming apparatuses which are intended to perform distributed processing may be unavailable for image processing. In such a case, the user may start the tandem processing without noticing the state, which may result in unexpected processing.

Further, there may be cases as follows. In cases of processing a great number of copies or a great number of prints, the user can easily understand that the use of the tandem processing will shorten the processing time. However, in cases of processing a smaller number of copies or a smaller numbers of prints, it is difficult to understand whether or not the use of the tandem processing is more efficient than regular (non-tandem) processing. This is because the borderline thereof depends on the number of pages for each copy or print to be processed and the processing capacities of the image forming apparatuses intended to perform distributed processing and, therefore, can not be uniformly determined. The difficulty of the determination may cause the user to think the use of the tandem function inconvenient.

SUMMARY OF THE INVENTION

There has been a need for an image forming system capable of making a determination whether or not the use of the tandem processing is more efficient than regular processing, without troubling a user, and capable of performing tandem processing according to the determination. Further, there has been a need for an image forming system capable of determining whether or not tandem processing should be selected, in consideration of the states and processing capacities of image forming apparatuses intended to perform distributed processing.

According to the present invention, there is provided an image forming system providing a plurality of image forming apparatuses and a processing controller for selecting at least one of the apparatuses and causing the selected apparatus to perform image formation, the plurality of image forming apparatuses and the processing controller being connected to one another through a network, wherein each of the image forming apparatuses includes an other-apparatus information storage section for storing information about one or more other image forming apparatuses as other-apparatus information, and the processing controller includes: an information acquiring section for acquiring the other-apparatus information stored in the other-apparatus information storage section of the selected apparatus through the network; a distributed-processing determination section for determining at least one of the one or more other apparatuses to be used for image formation in cooperation with the selected apparatus or determining that only the selected apparatus should be used for image formation, on the basis of the acquired other-apparatus information; and a commanding section for commanding the corresponding image forming apparatus(es) to perform the image formation, on the basis of the determination made by the distributed-processing determination section.

Here, the respective functions of the information acquiring section, the distributed-processing determination section and the commanding section of the processing controller may be realized by causing the CPU in the processing controller to execute printer driver programs installed in the processing controller. Further, the information acquiring section of the processing controller may acquire own-apparatus information together with the other-apparatus information and the distributed-processing determination section may determine the image forming apparatuses to be used for distributed processing for image formation, on the basis of the own-apparatus information and the other-apparatus information.

Further, the image forming apparatuses may be any apparatuses capable of performing image formation on receiving print data from a host, and the type and aspect thereof are not limited. For example, the image forming apparatuses may be electrophotographic digital multifunction peripherals (MFP) or ink-jet type multifunction peripherals. Further, the image forming apparatuses may have a copying function for reading documents and performing image forming processing, as well as a printing function, and may perform distributed processing for the copying function.

Further, the network may be any network which enables communications between the processing controller and the image forming apparatuses, and the type and aspect thereof are not limited. For example, the network may be an Ethernet LAN using the TCP/IP protocol. Also, the network may be a network which enables wireless communication among apparatuses.

According to the present invention, there is provided a printer driver program to be installed in a processing controller for selecting a single image forming apparatus from a plurality of image forming apparatuses, each image forming apparatus and the processing controller being connected to one another through a network, and for commanding the selected apparatus to perform image formation, the printer driver program causing the processing controller to function as: an information acquiring section for acquiring other-apparatus information from the selected apparatus which stores information about one or more other image forming apparatus as other-apparatus information; a distributed-processing determination section for determining at least one of the one or more other apparatuses to be used for image formation in cooperation with the selected apparatus or determining that only the selected apparatus should be used for image formation, on the basis of the acquired other-apparatus information; and a commanding section for commanding the corresponding image forming apparatus(es) to perform the image formation, on the basis of the determination made by the distributed-processing determination section.

Here, the printer driver causes the host to process data and generate print data so that the host supplies the print data to the image forming apparatuses and that the image forming apparatuses processes the print data by an image processing section included in the apparatuses. Generally, the printer driver is provided as processing programs to be executed by the CPU included in the host, and the CPU in the host executes the printer driver program to realize the functions of the printer driver.

Further, according to the present invention, there is provided an image forming apparatus including: a network connecting section for receiving a command for image formation from a processing controller which is connected to the image forming apparatus through a network; an other-apparatus information storage section for storing information about one or more other image forming apparatuses which are connected to the image forming apparatus through the network as other-apparatus information; an information transmission section for transmitting the stored other-apparatus information to the processing controller; and an image forming section for performing image forming processing in response to the received command.

Further, from a different view point, according to the present invention, there is provided an image formation commanding method for selecting a single image forming apparatus from a plurality of image forming apparatuses connected to one another through a network and commanding the selected apparatus to perform image formation, the selected apparatus storing information about one or more other image forming apparatuses as other-apparatus information, the method causing a computer to execute the steps of: acquiring the stored other-apparatus information from the selected apparatus; determining at least one of the one or more other-apparatuses to be used for image formation in cooperation with the selected apparatus or determining that only the selected apparatus should be used for image formation, on the basis of the acquired other-apparatus information, and commanding the corresponding image forming apparatus(es) to perform the image formation, on the basis of the determination made in the determining step.

According to the image forming system of the present invention, each of the image forming apparatuses includes the other-apparatus information storage section for storing information about the one or more other image forming apparatuses as the other-apparatus information, and the processing controller comprises: the information acquiring section for acquiring the other-apparatus information stored in the other-apparatus information storage section of the selected apparatus through the network; and the distributed-processing determination section for determining at least one of the one or more other apparatuses to be used for image formation in cooperation with the selected apparatus or determining that only the selected apparatus should be used for image formation, on the basis of the acquired other-apparatus information.

Accordingly, the distributed-processing determination section can determine whether or not distributed processing should be performed and can also determine the one or more other apparatuses to be used for distributed processing, without troubling the user.

The selected image forming apparatus may further include an other-apparatus information inputting section for inputting the other-apparatus information.

Further, the selected image forming apparatus may further include an other-apparatus information acquiring section for acquiring the other-apparatus information about the one or more other image forming apparatuses from the one or more other apparatuses through the network, and for storing the acquired other-apparatus information in the other-apparatus information storage section or updating the stored other-apparatus information.

The other-apparatus information may include a current state of the one or more other apparatuses.

According to the present invention, the printer driver program causing the processing controller to function as: the information acquiring section for acquiring other-apparatus information from the selected apparatus which stores information about the one or more other image forming apparatus as other-apparatus information; and the distributed-processing determination section for determining at least one of the one or more other apparatuses to be used for image formation in cooperation with the selected apparatus or determining that only the selected apparatus should be used for image formation, on the basis of the acquired other-apparatus information. Accordingly, the distributed-processing determination section can determine whether or not distributed processing should be performed and can also determine the one or more other apparatuses to be used for distributed processing, without troubling the user.

The other-apparatus information may include the current states of the corresponding image forming apparatuses.

Further, the image forming apparatus according to the invention includes an other-apparatus information storage section for storing information about one or more other image forming apparatuses which are connected to the image forming apparatus through the network as other-apparatus information; and an information transmission section for transmitting the stored other-apparatus information to the processing controller. Accordingly, it is possible to offer other-apparatus information and determine the image forming apparatus(es) to be used for distributed processing, for both the copying function and the printer function, wherein an image forming apparatus commands tandem processing for the copying function while a host commands tandem processing for the printer function.

Further, the image formation commanding method according to the invention comprises the steps of: acquiring the stored other-apparatus information from the selected apparatus; and determining at least one of the one or more other-apparatuses to be used for image formation in cooperation with the selected apparatus or determining that only the selected apparatus should be used for image formation, on the basis of the acquired other-apparatus information. Accordingly, it is possible to determine whether or not tandem processing should be performed for realizing higher efficiency, on the basis of the other-apparatus information, and perform tandem processing without troubling the user.

According to the printer driver program of the invention, the information acquiring section may acquire an image-formation processing speed of the one or more other apparatuses as the other-apparatus information, and the distributed-processing determination section may make its determination on the basis of the acquired image-formation processing speed. Accordingly, the printer driver program allows the processing controller to determine the image forming apparatus(es) capable of efficiently performing distributed processing on the basis of the acquired information on the image formation speed.

In accordance with the printer driver program of the present invention, the information acquiring section may acquire an installation position of the one or more other apparatuses as the other-apparatus information, and the distributed-processing determination section may make its determination on the basis of the acquired installation position. With such a configuration, printer driver program allows the processing controller to determine the other apparatus(es) installed near the selected apparatus on the basis of information about the acquired installation positions, for user's convenience.

According to the printer driver program of the invention, the information acquiring section may further acquire information about whether or not the selected apparatus is in a state capable of image formation, and the printer driver program may further cause the processing controller to function as a substitute-apparatus selecting section for selecting at least one of the one or more other apparatuses to be substitutionally used for image formation when the selected apparatus is not in the state capable of image formation. With such a configuration, even when the selected apparatus is in a state incapable of image formation, such as paper exhaustion or failures, another-apparatus can be used for image formation instead of the selected apparatus.

The information acquiring section may further acquire information about the selected image forming apparatus.

The image forming apparatus according to the present invention may further include an other-apparatus information inputting section for inputting the other-apparatus information. This enables an operator to input or change other-apparatus information through the other-apparatus information inputting section.

It is preferable that the other-apparatus information inputting section is an operation panel including a display section and keys. Also, other-apparatus information may be an input means that allows for input through the network by using the image forming apparatus as a terminal.

The image forming apparatus of the invention may further include an other-apparatus information acquiring section for acquiring the information about the one or more other image forming apparatuses from the one or more other apparatuses through the network and for storing the acquired information in the other-apparatus information storage section or updating the stored other-apparatus information. With such a configuration, it is possible to acquire the state of other apparatus(es) and use it along with other-apparatus information to make determination about distribution processing.

Also, the image forming apparatus of the invention may further include an authentication processing section for performing operator authentication processing prior to the inputting from the other-apparatus information inputting section. This can prevent a stranger from changing the other-apparatus information. This is convenient for a manager of the image forming apparatus, such as a system administrator.

In accordance with the image forming apparatus of the invention, the network may include a predetermined network therein, and the apparatus may further include a position determination section for determining whether or not the one or more other apparatuses are placed within the predetermined network prior to the storing of the other-apparatus information in the other-apparatus information storage section. This can prevent information about the one or more image forming apparatuses which are not connected to the predetermined network from being input by mistake, which is convenient for the manager since the necessity of wasteful operations can be eliminated.

According to the image forming apparatus of the present invention, the information transmission section may transmit only the other-apparatus information about the one or more other apparatuses which are in a state capable of image formation. With such a configuration, only the other-apparatus information about the image forming apparatus which is capable of distributed processing is transmitted, which allows for a reduced amount of communication and reduced time and effort involved in the determination processing than those involved in transmission of all the stored information.

According to the image forming apparatus of the invention, the information transmission section may further transmit information about the image forming apparatus. This enables acquisition of the other-apparatus information and information about the image forming apparatus itself at the same time, which can simplify transfer of information, in comparison with the case of transmitting information about the selected image forming apparatus separately from the other-apparatus information. Further, time for transferring the information can be reduced.

BRIEF DESCRIPTION OF THE DRAWINGS

FIG. 8 is an explanation view illustrating exemplary information about an image forming apparatus according to the present invention, including other-apparatus information.

DETAILED DESCRIPTION OF PREFERRED EMBODIMENTS

Figure 1:
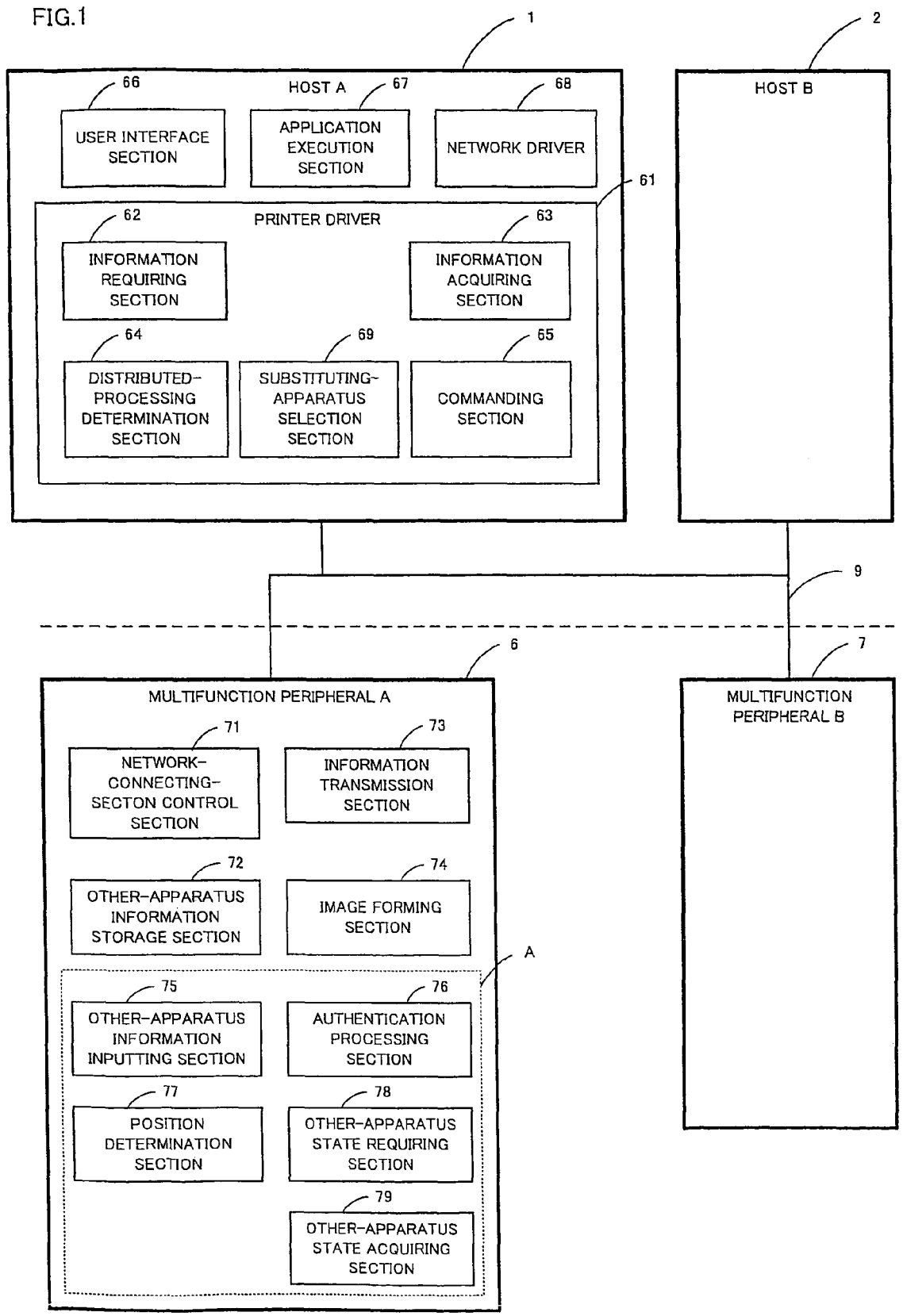
FIG. 1 is a block diagram illustrating an exemplary functional structure of a host A 1 which is a processing controller according to the present invention and a multifunction peripheral A 6 which is a selected image forming apparatus.

Hereinafter, the present invention will be described in more detail, on the basis of embodiments illustrated in the drawings. The present invention will be better understood from the following descriptions. The following description is not intended to restrict the present invention.

Figure 3:
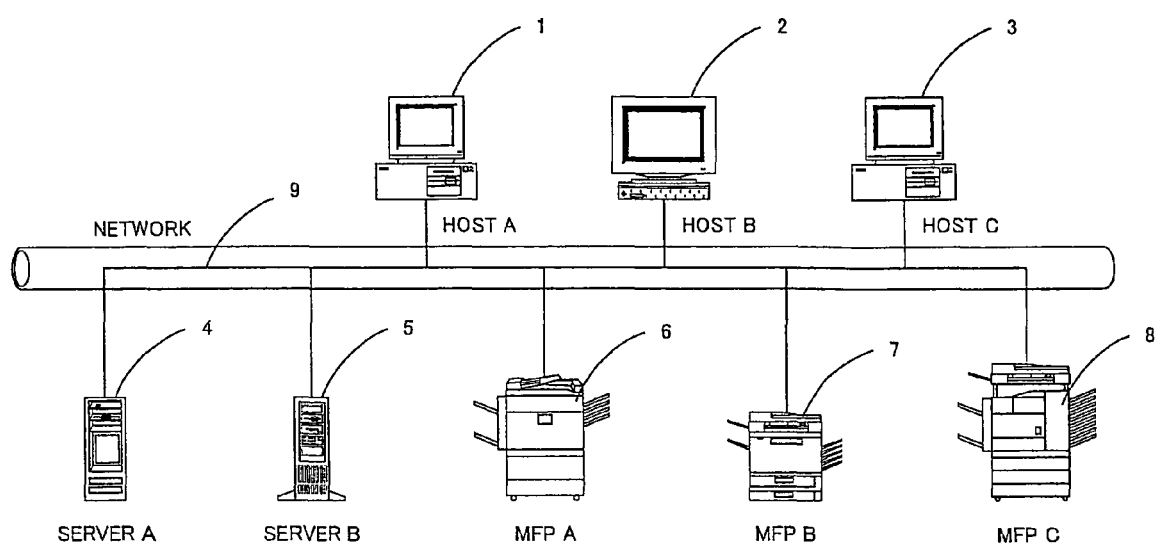
FIG. 3 is an explanation view illustrating an exemplary aspect in which a host which is a processing controller according to the present invention and a multifunction peripheral which is an image forming device are connected to a network.

First, there will be described the entire structure of an image forming system including processing controllers according to the present invention and image forming apparatuses. FIG. 3 is an explanation view illustrating an exemplary aspect in which hosts which are processing controllers according to the present invention and multifunction peripherals which are image forming apparatuses are connected to a network. As illustrated in FIG. 3, a host A 1, a host B 2, a host C 3 are connected to the network 9. Further, a multifunction peripheral A 6, a multifunction peripheral B 7, a multifunction peripheral C 8 are connected to the aforementioned network 9. Further, a server A 4 and a server B 5 are connected to the network 9.

Programs for a printer driver are installed in the host A 1. The CPU in the host A 1 executes the installed printer driver program to function as a printer driver and is capable of causing the multifunction peripheral A 6 to print data stored in the host A 1. Further, the host A 1 can log in the server A 4 or the server B 5 and can cause the multifunction peripheral A 6 to print data stored in these servers. The host A 1 commands the multifunction peripheral A 6 to perform printing, through the network 9. Also, the host A 1 commands the multifunction peripheral B 7 and the multifunction peripheral C 8 to perform printing. Further, the host A1 may be structured to cause the multifunction peripheral A 6 to print image data which is stored in the multifunction peripheral A 6, so-called filing jobs. Also, the host A 1 may be structured to cause the multifunction peripheral B 7 to print filing jobs stored in the multifunction peripheral B 7. Also, the host A 1 may be structured to cause the multifunction peripheral C 8 to print filing jobs stored in the multifunction peripheral C 8.

Further, the host B 2 can cause the multifunction peripheral A 6, the multifunction peripheral B 7 or the multifunction peripheral C 8 to print data stored in the host B 2, data stored in the server A 4 or data stored in the server B 5. Also, the host B 2 may be structured to cause the multifunction peripheral A 6, the multifunction peripheral B 7 or the multifunction peripheral C 8 to print filing jobs stored in the respective multifunction peripherals.

Further, the host C 3 can cause the multifunction peripheral A 6, the multifunction peripheral B 7 or the multifunction peripheral C 8 to print data stored in the host C 3, data stored in the server A 4 or data stored in the server B 5. Also, the host B 2 may be structured to cause the multifunction peripheral A 6, the multifunction peripheral B 7 or the multifunction peripheral B 7 to print filing jobs stored in the respective multifunction peripherals.

Further, the host A 1, the host B 2 and the host C3 can distribute printing processing to a plurality of multifunction peripherals. For example, in cases where a printing job for 50 prints is processed, the multifunction peripheral A 1 may be used for processing 30 prints while the multifunction peripheral B 2 may be used for processing the remaining 20 prints. This is so-called tandem printing.

The multifunction peripheral A 6 receives printing commands from the host A 1, the host B 2 and the host C 3 through the network 9. Further, the multifunction peripheral A6 can acquire the states of the other multifunction peripherals B 7 and C8, through the network 9. Further, the multifunction peripheral A 6 can notify the multifunction peripheral B 7 and the multifunction peripheral C 8 of the state of the multifunction peripheral A6 itself.

Figure 2:
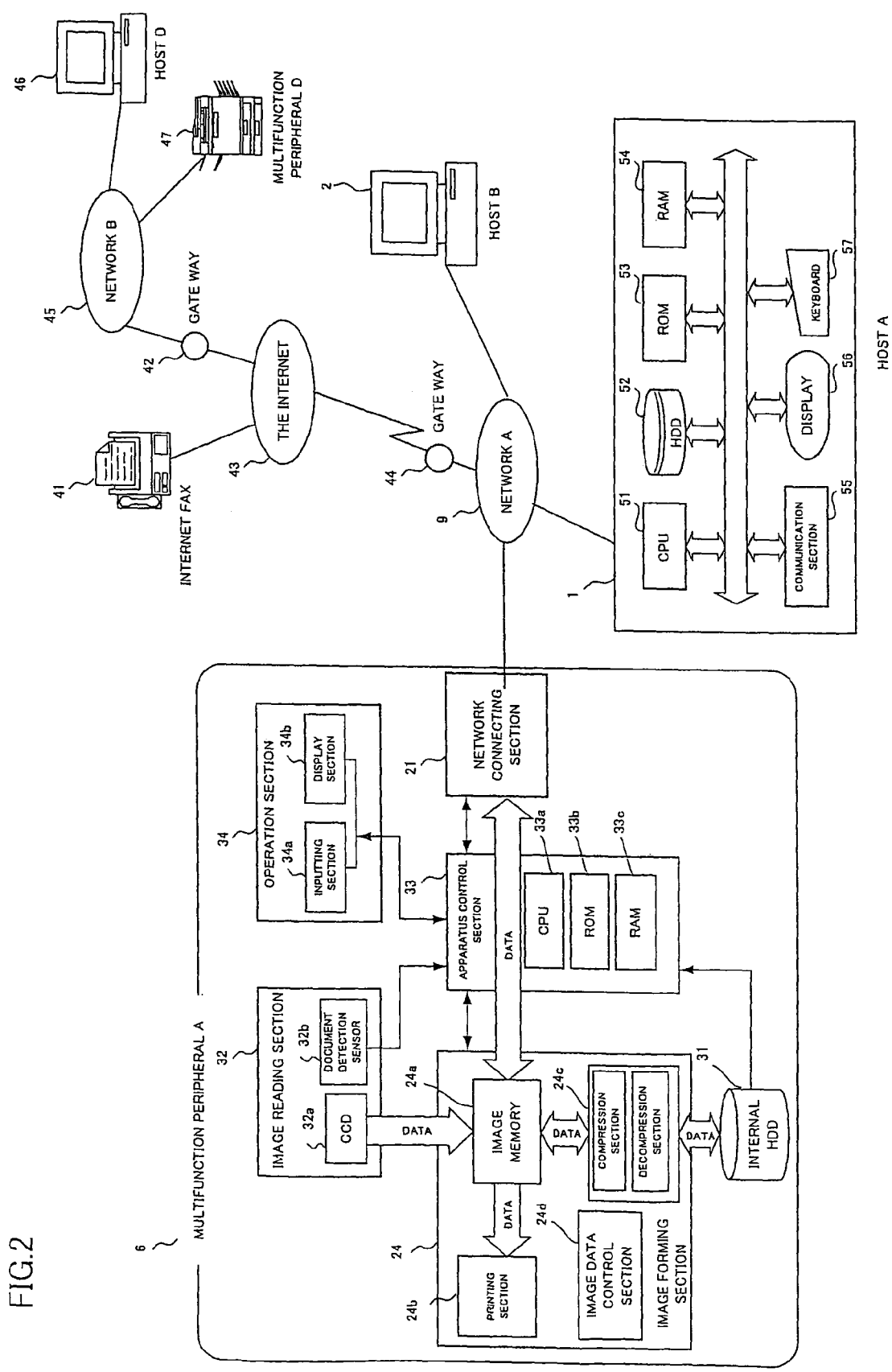
FIG. 2 is a block diagram illustrating the internal structures of the respective hardware of the multifunction peripheral A 6 which is a selected image forming apparatus for image formation, out of the image forming devices according to the present invention, and the host A 1 which is a processing controller.

FIG. 2 is a block diagram illustrating the internal structure of the hardware of an image forming apparatus according to the present invention. In FIG. 2, the multifunction peripheral A 6 is a selected image information apparatus which was selected by the host A 1 which is a processing controller for generating image-forming commands. As illustrated in FIG. 2, the multifunction peripheral A 6 and the host A 1 are connected to each other through the network A 9. Further, the host B2 is also connected to the network A 9. Further, although not illustrated in FIG. 2, other hosts, multifunction peripherals and servers may be connected to the network A 9.

The network A 9 is connected to the internet 43 through a gateway 44. A network B 45, which is another network, is connected to the internet 43 through an internet FAX 41 and a gateway 42. Further, a host D 46 and a multifunction peripheral D 47 are connected to the network B 45.

The host A 1 is constituted by hardware such as a CPU 51, a HDD 52, a ROM 53, a RAM 54, a communication section 55, a display 56, a keyboard 57. When the host A 1 is powered on, the CPU 51 executes a boot program stored in the ROM 53. By executing the boot program, the CPU 51 reads, from the HDD 52, programs for an OS, an application and a printer driver and the like and downloads them to the RAM 54. Thereafter, the CPU 51 executes the programs for the OS and the application and the like deployed in the RAM 54. Further, in cases where printing processing is to be performed, the CPU 51 executes programs for the printer driver. The display 56, the keyboard 57 and a mouse which is not illustrated provide a user interface between the host A1 and an operator. The operator recognizes the execution state of the OS and the application on the basis of the content displayed on the screen of the display 56 and generates commands to the application and the like which are being executed. If the operator generates a command for printing processing, the CPU 51 executes processing for the printer driver. If the multifunction peripheral A 6 is selected as a printing device through a menu on the printer driver, the CPU 51 transmits and receives information about printing to or from the multifunction peripheral A 6. Then, the CPU 51 creates print data in the RAM 54 and transfers the created print data from the communication section 55 to the multifunction peripheral A 6 through the network 9.

The multifunction peripheral A 6 is constituted by an image reading section 32, an image forming section 24, an operation section 34, a apparatus control section 33, an internal HDD 31 and a network connecting section 21. The image reading section 32 is a block which reads images on documents when the multifunction peripheral A6 functions as a copier or a scanner. The image reading section 32 includes a CCD sensor 32a and a document detection sensor 32b. The CCD sensor 32a is a sensor for reading images on documents. The document detection sensor 32b determines whether or not a document to be read is placed at a predetermined position of the document detection sensor 32b and, if the document is placed thereat, detects the document size. The image forming section 24 is a block that prints image data on documents read by the image reading section 32 or image data received from the network 9 through the network connecting section 21.

The image forming section 24 is a block that prints received image data onto paper. The image forming section 24 includes an image memory 24a, a printing section 24b, a compression and decompression section 24c, and an image data control section 24d. The image memory 24a temporarily stores the received image data. The compression and decompression section 24c is constituted by a compression section for compressing the image data stored in the image memory 24a and storing it in the internal HDD and a decompression section for decompressing the compressed data stored in the internal HDD and restoring it to the image memory 24a. The printing section 24b prints the image data stored in the image memory 24a onto paper. The image data control section 24d controls the transfer of image data among the image memory 24a, the printing section 24b and the compression and decompression section 24c and also controls the treatment of the image data in the image memory 24a. Although not illustrated in detail in FIG. 2, the image data control section 24d may be constituted by a CPU, a ROM for storing programs to be executed by the CPU, circuits for treating image data and the like.

The operation section 34 is constituted by a display section 34b for notifying the operator of the state of the multifunction peripheral A, and an inputting section 34a for receiving commands from the operator. More specifically, for example, the display section 34b may be constituted by a dot-matrix liquid crystal display screen and the inputting section 34a may be constituted by a touch panel provided on the liquid crystal display screen, dedicated keys and the like.

The network connecting section 21 is an interface for connecting the multifunction peripheral A6 to the network A 9. The network A 9 may be, for example, a well-known Ethernet which may operate according to the TCP/IP protocol.

The apparatus control section 33 controls the operations of the aforementioned respective blocks in the multifunction peripheral A 6. The apparatus control section 33 is constituted by a CPU 33a, a ROM 33b which stores programs to be executed by the CPU and a RAM 33c for operations.

Next, there will be described the functional structure of the image forming system including processing controllers and image forming apparatuses according to the present invention. FIG. 1 is a block diagram illustrating exemplary functional structures of the host A 1 which is a processing controller according to the present invention and the multifunction peripheral A 6 which is a selected image forming apparatus. As illustrated in FIG. 1, the host A1, the host B 2, the multifunction peripheral A 6 and the multifunction peripheral B 7 are connected to the network 9.

The multifunction peripheral A 6 includes a network-connecting-section control section 71, an other-apparatus information storage section 72 and an image forming section 74 (corresponding to the image forming section 24 of FIG. 2). The network-connecting-section control section 71 is a block for controlling the network connecting section 21 of FIG. 2. The other-apparatus information storage section 72 is a block for storing information about image formation in other image forming apparatuses, namely other-apparatus information. The image forming section 74 is a block for performing image forming processing to output the result of printing. Further, the multifunction peripheral A 6 may include some or all of the blocks enclosed by a chain line A in FIG. 1. Namely, the multifunction peripheral A 6 may include some or all of the blocks of an other-apparatus information inputting section 75, an authentication processing section 76, a position determination section 77, an other-apparatus state requiring section 78 and an other-apparatus state acquiring section 79. The other-apparatus information inputting section 75 is a block for inputting other-apparatus information to be stored in the other-apparatus information storage section 72. The authentication processing section 76 is a block which makes a request for authentication to a person who intends to input other-apparatus information from the other-apparatus information inputting section 75 and judges the authentication code input in response to the request. The position determination section 77 is a block for determining the positions on the network communication at which the other-apparatuses are placed or the positions at which they are physically placed. The other-apparatus state requiring section 78 is a block which makes a request for the most recent states, to the other apparatuses, the other-apparatus information about which is stored in the other-apparatus information storage section 72. The other-apparatus state acquiring section 79 is a block which acquires state information which the other apparatuses transmit thereto in response to the request of the other-apparatus requiring section 78.

The aforementioned respective blocks are programs which are stored in the ROM 33*b* included in the apparatus control section 33 of FIG. 1 and are executed by the CPU 33*a*.

The host A1 includes a printer driver 61, a user interface section 66, an application execution section 67 and a network driver 68. The printer driver 61 is a block which executes processing relating to printing. The application execution section 67 is a block which executes applications. The user interface section 66 is a block which controls the user interface in executing the printer driver and applications. The network driver 68 is a block for transmitting and receiving information through the network 9. Further, the printer driver 61 is a program which is stored in the HDD 52 in FIG. 2 and is executed by the CPU 51.

The printer driver 61 includes an information requiring section 62, an information acquiring section 63, a distributed-processing determination section 64 and a commanding section 65. The information requiring section 62 is a block which makes a request to an image forming apparatus which is intended to perform printing, for example, the MFP A 6, for information about image formation processing. The information acquiring section 63 is a block for acquiring information which is transmitted from the MFP A 6 transmits in response to the aforementioned request. The distributed-processing determination section 64 is a block which determines whether or not tandem printing should be performed, on the basis of the acquired information. The commanding section 65 is a block which generates a command for the performance of printing, to the image forming apparatus intended to perform image formation processing, on the basis of the result of the determination.

Here, the information about image forming processing includes information about image forming apparatuses other than the multifunction peripheral A 6, namely other-apparatus information. The other-apparatus information is, for example, information about the multifunction peripheral B 7 connected to the network 9 to which the multifunction peripheral A 6 is connected. Also, it may include information about the multifunction peripheral A 6.

Next, there will be described other-apparatus information which is transferred between the processing controller and the image forming apparatus according to the present invention.

FIG. 8 is an explanation view illustrating exemplary information which is transferred between the processing controller and the image forming apparatus according to the present invention. As illustrated in FIG. 8, to-be-transferred information may be divided into own-apparatus information which is information about a selected image forming apparatus and other-apparatus information which is information about other image forming apparatuses. While, in FIG. 8, there is exemplified other-apparatus information about a single apparatus, other-apparatus information about a plurality of apparatuses may be employed.

The other-apparatus information includes contents such as, for example, an IP address for identifying the apparatus on the network, a subnet mask and a gateway used in accessing the apparatus, a installation position indicative of the department or the like in which the apparatus is installed, the maker of the apparatus, the model number of the apparatus, the printing speed of the apparatus as information indicative of the processing capacity thereof, the availability or unavailability of double-side mounting as information about the structure of apparatus peripheral devices, the types of available post-processing functions, the paper sizes and paper types of respective paper-feeding trays, information about whether or not the apparatus permits tandem processing, the state of the apparatus, peripheral-device information indicative of the states of the functions of peripheral devices.

The aforementioned other-apparatus information may be broadly divided into two types of information. One of them is fixed information set by a manager or the like, such as the IP address, the maker of the apparatus, the model number and the processing capacity. The content of the fixed information is not varied as long as the manager or the like does not change the setting. The other one is state information indicative of the state of the apparatus and the states of peripheral devices. More specifically, the state information is information about whether or not the apparatus is being at a standby state, the availability or unavailability of a staple needle, the presence or absence of a toner, the presence or absence of paper, the remaining quantity of paper and the like. The state information is variable information which is varied depending on the utilization condition of the apparatus.

There are methods with which the selected image forming apparatus stores other-apparatus information in the other-apparatus information storage section as follows, for example. As a first method, other-apparatus information is set through the operation panel of the selected image forming apparatus. As a second method, the selected image forming apparatus communicates with other apparatuses at predetermined timing such as the timing of power-on to acquire information thereabout at the timing. The fixed information can be set with any of the aforementioned methods. On the other hand, in order to set the state information, due to the characteristics thereof, it is necessary to communicate with other apparatuses to acquire information thereabout and update it after each communication.

The selected image forming apparatus can communicate with other apparatuses as follows. For example, the selected image forming apparatus can register the IP addresses of other apparatuses in advance as nonvolatile data and can access the registered IP addresses at power on to acquire information about the other apparatuses. Alternatively, the selected image forming apparatus can search the other apparatuses on the network at regular time intervals and can hold and update the IP addresses of the detected apparatuses.

Further, in order to acquire other-apparatus information, the selected image forming apparatus may access other apparatuses at regular time intervals. The period of access to the other apparatuses may be pre-programmed as a fixed value. Alternatively, the period may be registered as nonvolatile data before the shipment from the factory and a manager or the like may change the registered period as required.

First Embodiment

In the present embodiment, there will be described an exemplary processing procedure in the case where an operator generates a command for tandem printing processing.

Figure 4:
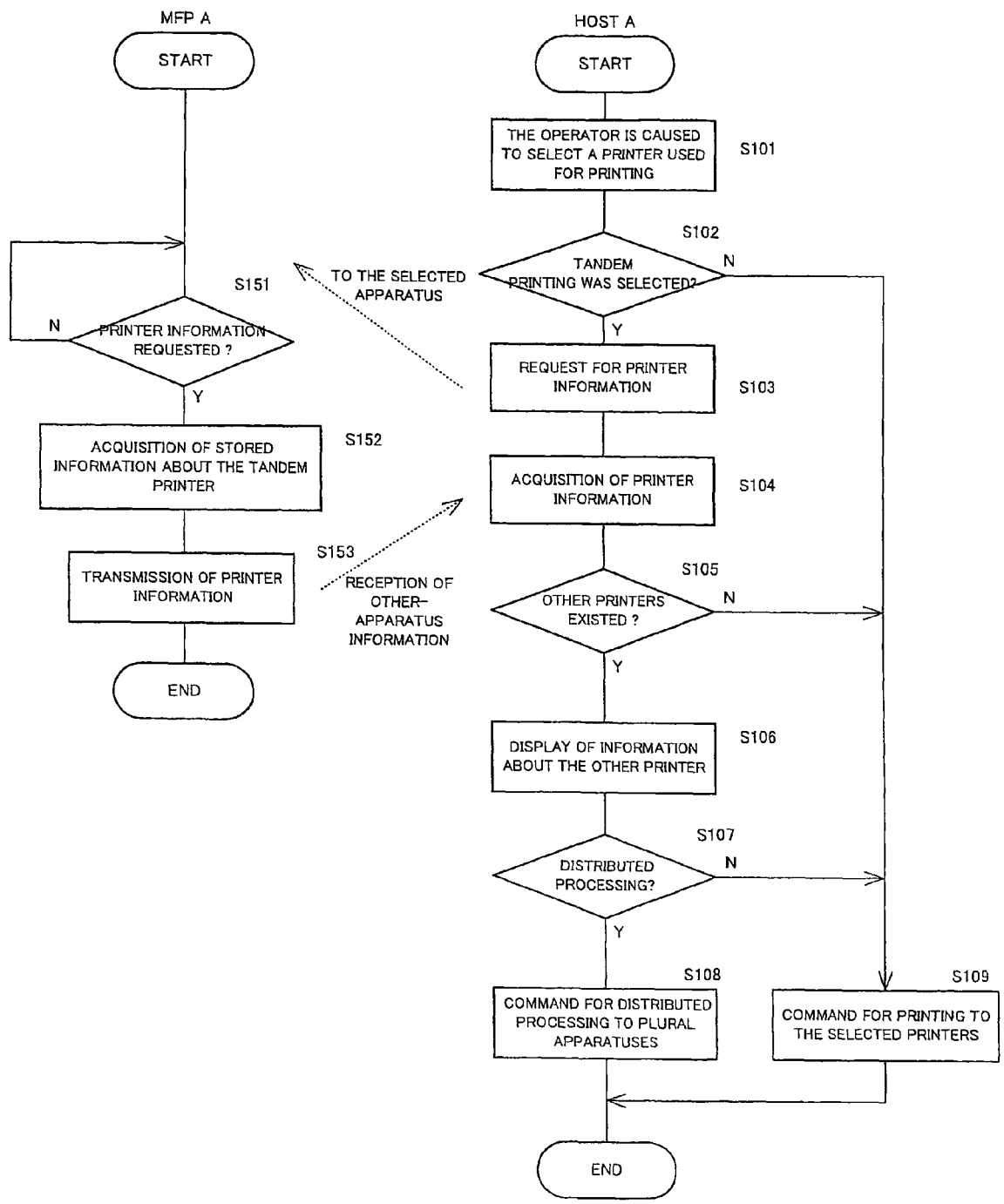
FIG. 4 is a flow chart illustrating a processing procedure which is executed by the printer driver 61 in the host A 1 and the multifunction peripheral A 6 illustrated in FIG. 1.
Figure 9:
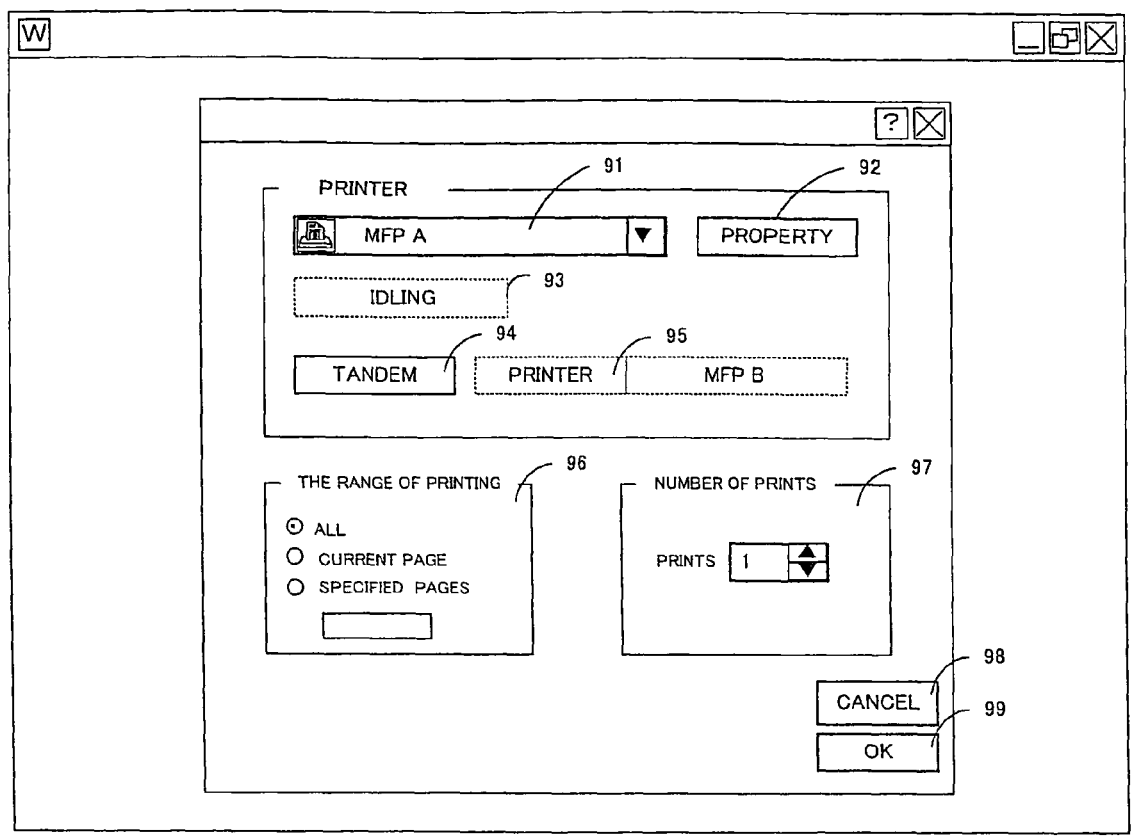
FIG. 9 is an explanation view illustrating an exemplary printing setting screen in the host A 1 in FIG. 1.

FIG. 4 is a flow chart illustrating processing procedure which is executed by the printer driver 61 in the host A1 in FIG. 1 and processing procedure which is executed by the multifunction peripheral A6. First, an operator of the host A1 generates a command for printing processing, on an application that is being executed by the application execution section 67. More specifically, the aforementioned operator inputs a printing command using a menu or the like on the application through the user interface section 66. The input command is sent to the printer driver 61. In response to the command, the printer driver 61 causes the display 56 to display a window which suggests selectable printing conditions to the operator. The displayed window is a printing setting screen which causes the operator to select printing conditions to be executed. The printer driver 61 causes the display 56 to display the aforementioned window through the user interface section 66. FIG. 9 is an explanation view illustrating an exemplary printing setting screen displayed in the host A1 in FIG. 1. The printer driver 61 causes the operator to select a printer for use in printing, as one of the printing conditions (step S101).

Further, on the printing setting screen in FIG. 9, the operator selects a printer for use in printing, for example, the multifunction peripheral A6, through a drop-down menu 91. A state display section 93 displays the state of the selected printer. Further, as other printing-condition setting items, there are provided a tandem-processing selection button 94 for selecting whether or not tandem printing processing for distributing printing processing to a plurality of printers should be conducted, a printing-range radio button 96 for selecting pages to be printed and a number-of-prints setting menu 97 for setting the number of prints. Further, there is provided a property button 92 for displaying a detailed printing setting screen for the selected printer.

Next, the printer driver 61 determines whether or not the operator selected tandem printing processing (step S102). If tandem printing was not selected, the routine proceeds to a step S109. Then, the commanding section 65 sends a command for the performance of printing processing, to the multifunction peripheral A6 selected through the drop-down menu 91. On the other hand, if tandem printing was selected, the information requiring section 62 makes a request for printer information, to the multifunction peripheral A6 selected through the drop-down menu 91 (step S103).

During the aforementioned processing by the host A1, the multifunction peripheral A6 monitors whether or not it has received a request for printer information, from the hosts connected to the network 9 (step S151). On receiving a request for printer information from the host A1, an information transmission section 73 in the multifunction peripheral A6 acquires information about the tandem printer which is stored in the other-apparatus information storage section 72, namely other-apparatus information (step S152). Then, the information transmission section 73 sends printer information to the host A1 (step S153). If there is no other-apparatus information stored in the other-apparatus information storage section 72, the information transmission section 73 sends empty information to the host A 1. The aforementioned printer information includes the other-apparatus information acquired at the aforementioned step S152. Further, the printer information may include information about the own apparatus.

The information acquiring section 63 in the printer driver 61 acquires the printer information from the multifunction peripheral A 6 (step S104). Then, the acquired information is supplied to the distributed-processing determination section 64. The distributed-processing determination section 64 determines whether or not the acquired printer information is empty (step S105). If the acquired information is empty, the distributed-processing determination section 64 determines that it is impossible to perform tandem processing and then proceeds to a step S109 where printing is performed only by the multifunction peripheral A 6. On the other hand, if the printer information is not empty, the distributed-processing determination section 64 displays the acquired other-apparatus information on the printing setting screen (step S106). On the printing setting screen in FIG. 9, a tandem-printer indicating section 95 indicates the multifunction peripheral B 7 which is the tandem printer selected by the distributed-processing determination section 64 on the basis of the other-apparatus information.

If the printer driver 61 detects that an OK button 99 has been pushed on the printing setting screen in FIG. 9, the distributed-processing determination section 64 finally determines the printer for use in printing processing. At this time, tandem printing is finally selected. The distributed-processing determination processing 64 determines whether or not a tandem printer usable for printing was selected (step S107). The determination as to whether or not the tandem printer is usable for printing can be performed on the basis of whether or not the "states" of the own-apparatus information and other-apparatus information illustrated in FIG. 8 are standby state. Further, if paper of the type to be used for printing is not mounted in any of the trays, it can be determined that the tandem printer is not usable for printing. Further, in the case of double-side printing, if "double-side" is set to be "unavailable", it can be determined that the tandem printer is not usable for printing. In the case of using a post-processing function, "post-processing" is referred to and, if the post-processing function is not available, it is determined that the tandem printer is not usable for printing.

Further, the printer driver 61 creates print data to be transferred to the printers as required. However, in the case of filing jobs, the printer driver 61 only generates a command for printing, but does not create print data. This is because print data has been already created. The commanding section 65 generates a printing command to the printers which were finally selected according to the determination by the distributed-processing determination section 64. Further, print data is transferred to the printers as required and causes the transfer-destination printers to perform printing processing. For example, on the printing setting screen in FIG. 9, the multifunction peripheral A 6 is selected as the printer and the multifunction peripheral B 7 is selected as the tandem printer. In this case, the printer driver 61 sends printing commands to both the multifunction peripheral A 6 and the multifunction peripheral B 7 (step S108). On the other hand, if the distributed-processing determination section 64 determines that tandem printing should not be performed and, thus, only the multifunction peripheral A 6 is used for printing, the printer driver 61 sends a printing command to only the multifunction peripheral A 6 (step S109).

Second Embodiment

In the present embodiment, there will be described a case where the printer driver determines whether or not tandem printing processing should be performed, on the basis of printer information, even when the operator generates no command.

Figure 5:
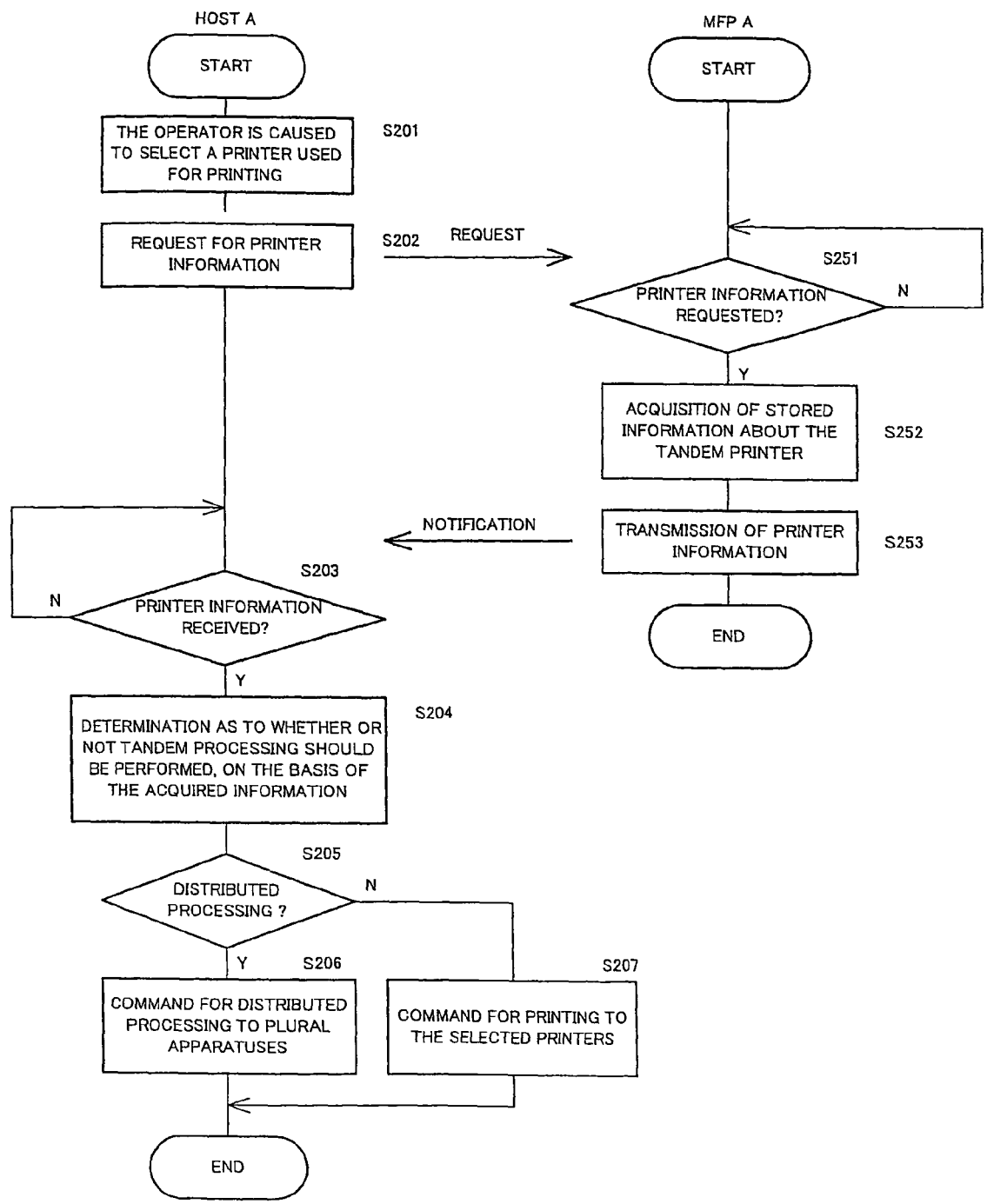
FIG. 5 is a flow chart illustrating a processing procedure which is executed by the printer driver 61 in the host A 1 and the multifunction peripheral A 6 illustrated in FIG. 1, the processing procedure being different from that in the first embodiment.

FIG. 5 is a flow chart illustrating a processing procedure which is executed by the printer driver 61 in the host A 1 and the multifunction peripheral A 6 illustrated in FIG. 1, wherein the processing procedure is different from that in the first embodiment. The printer driver 61 causes the operator to select a printer to be used for printing on the setting screen (step S201). The printing setting screen according to the present embodiment is different from the printing setting screen illustrated in FIG. 9 in that there is provided no tandem-processing selection button 94 which enables the operator to select tandem printing, while the other structures are the same as the printing setting screen in FIG. 9. Accordingly, the printing setting screen according to the present embodiment is not illustrated. In the following description, FIG. 9 is employed again.

When a printer to be used for printing has been selected, the information requiring section 62 makes a request for printer information, to the multifunction peripheral A 6 selected through the drop-down menu 91 (step S202).

At this time, the multifunction peripheral S 6 monitors whether or not it has received a request for printer information, from the hosts connected to the network 9 (step S251). On receiving a request for printer information from the host A 1, the information transmission section 73 in the multifunction peripheral S 6 acquires information about the tandem printer which is stored in the other-apparatus information storage section 72, namely other-apparatus information (step S252), and transmits printer information to the host A 1 (step S253). If there is no other-apparatus information stored in the other-apparatus information storage section 72, the information transmission section 73 transmits empty information to the host A 1. The aforementioned printer information includes the other-apparatus information acquired at the aforementioned step S152. Also, the aforementioned printer information may include own-apparatus information.

The information acquiring section 63 in the printer driver 61 receives the printer information from the multifunction peripheral A 6 (step S203) and the acquired information is supplied to the distributed-processing determination section 64. The distributed-processing determination section 64 determines whether or not the acquired printer information is empty information and also determines whether or not distributed processing should be performed from the acquired printer information for efficiently performing processing (step S204).

The determination as to whether or not distributed processing should be performed for efficiently performing processing can be performed as follows. First, it is determined whether or not the other apparatus is usable for printing, by referring to the other-apparatus information illustrated in FIG. 8. If the other apparatus is not usable for printing, distributed processing is not performed. Further, if the other apparatus is usable for printing, the "printing speed" is referred to and, if it is equal to or more than a predetermined ratio, for example, 80%, of the printing speed of the own apparatus, it is determined that distributed processing can be efficiently performed. In the example of FIG. 8, both the apparatuses have a printing speed of 45 prints/min and, therefore, the ratio of the printing speed of the other apparatus with respect to that of the own apparatus is 100%, and, accordingly, it is determined that tandem processing should be performed.

Then, if it is determined that tandem processing should be performed, a tandem printer is selected and information about the selected tandem printer is displayed on the tandem-printer indicating section 95 on the printing setting screen.

If the printer driver 61 detects that the OK button 99 has been pushed on the printing setting screen in FIG. 9, the distributed-processing determination section 64 finally determines the printer for use in printing processing (step S205). Further, the printer driver 61 creates print data to be transferred to the printers, as required. However, in the case of filing jobs, the printer driver 61 generates only a command for printing, but does not create print data, since print data has been already created. The commanding section 65 sends a printing command to the printers which were finally selected according to the determination by the distributed-processing determination section 64. Further, the printer driver 61 transfers print data to the selected printers and causes the transfer-destination printers to perform printing processing, as required. For example, if the operator selects the multifunction peripheral A 6 and the distributed-processing determination section 64 selects the multifunction peripheral B 7 as the tandem printer, the commanding section 65 sends printing commands to both the multifunction peripheral A 6 and the multifunction peripheral B 7 (step S206). On the other hand, if the distributed-processing determination section 64 determines that tandem printing should not be performed and, thus, only the multifunction peripheral A 6 selected by the operator is used for printing, the commanding section 65 sends a printing command only to the multifunction peripheral A 6 (step S207).

Also, the printer driver 61 may include a substitute-apparatus selection section 69. In this case, if the printer information transmitted at the aforementioned step 253 includes own-apparatus information about the multifunction peripheral A 6 and it is determined at the step S204 that the multifunction peripheral A 6 is not usable for printing processing, the substitute-apparatus selection section 69 selects a printer to be used for printing processing, instead of the multifunction peripheral A 6. For example, the substitute-apparatus selection section 69 may select the multifunction peripheral B 7, as a substitute-apparatus.

Third Embodiment

In the present embodiment, there will be described a case where a printer acquires the states of other apparatuses, on receiving a request for printer information, and then transmits, to the host, printer information including the updated states.

Figure 7:
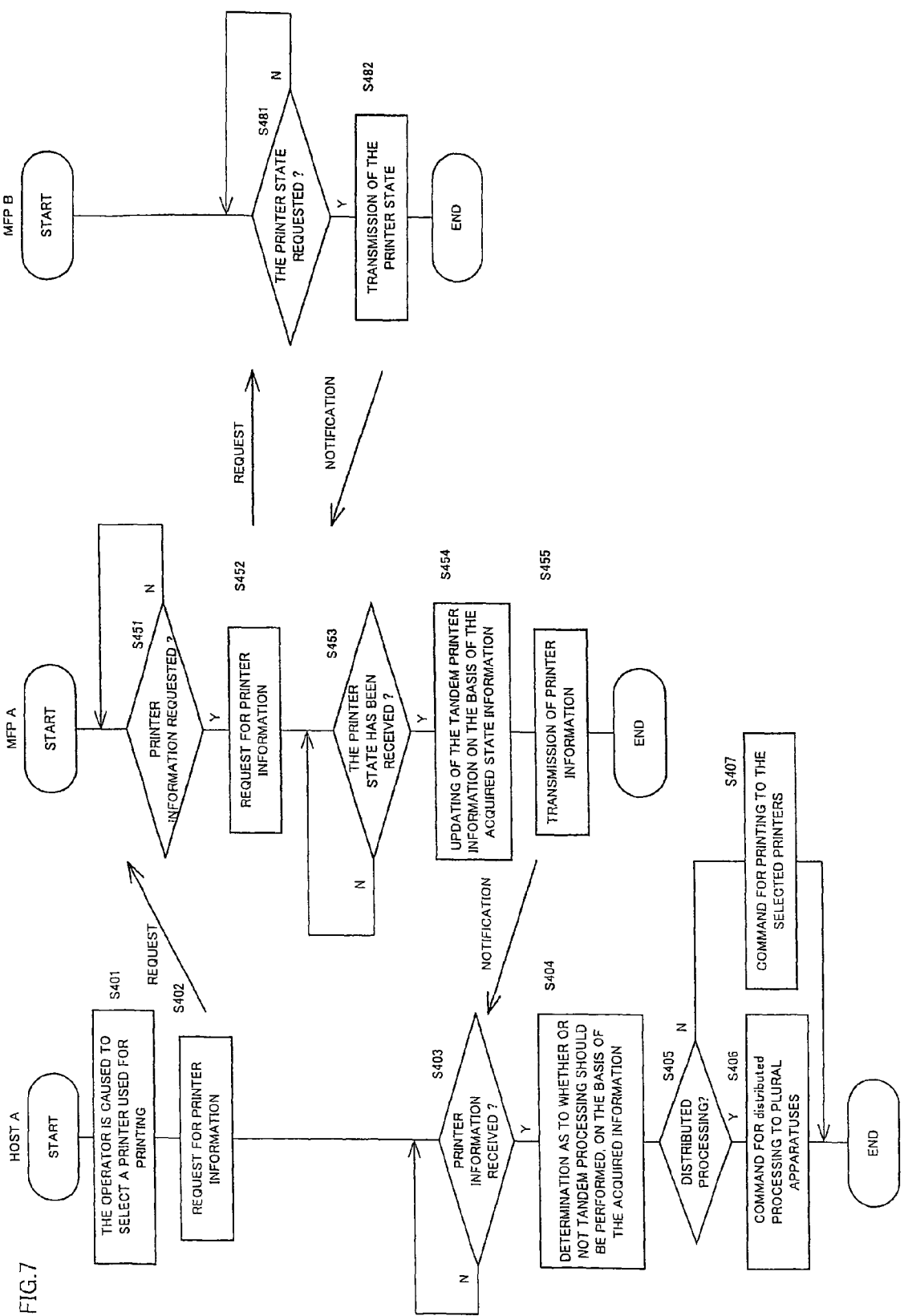
FIG. 7 is a flow chart illustrating processing which is executed by the printer driver 61 in the host A 1, the multifunction peripheral A 6 and a multifunction peripheral B 7 illustrated in FIG. 1, the processing procedure being different from those in the first and second embodiments.

FIG. 7 is a flow chart illustrating a processing procedure which is executed by the printer driver 61 in the host A 1, the multifunction peripheral A 6 and the compound B 7 illustrated in FIG. 1. FIG. 7 is a flow chart illustrating a processing procedure different from those in the first and second embodiments. The printer driver 61 causes the operator to select a printer to be used for printing on the setting screen (step S401).

When the printer to be used for printing has been selected, the information requiring section 62 makes a request for printer information, to the multifunction peripheral A 6 selected through the drop-down menu 91 (step S402).

On the other hand, the multifunction peripheral A 6 monitors whether or not it has received a request for printer information, from the hosts connected to the network 9 (step S451). On receiving a request for printer information from the host A 1, the other-apparatus-state requiring section 78 in the multifunction peripheral A 6 makes a request for the printer state, to the other printer stored in the other-apparatus information storage section 72, for example, the multifunction peripheral B 7 (step S452).

The multifunction peripheral B 7 monitors whether or not it has received a request for the printer state, from the other printers connected to the network 9 (step S481). On receiving a request for the printer state, the multifunction peripheral B 7 sends the current printer state to the multifunction peripheral A 6 which is the source of the request (step S482). Here, the printer state refers to the aforementioned state information and, for example, it is information about the "state" or the "post-processing" of the other apparatus illustrated in FIG. 8.

The other-apparatus-state acquiring section 79 in the multifunction peripheral A 6 waits for printer-state information from the multifunction peripheral B7 to which the request for the printer state was made (step S453). On receiving the printer-state information therefrom, the other-apparatus-state acquiring section 79 updates the information about the tandem printer which is stored in the other-apparatus information storage section 72, namely the other-apparatus information (step S454). Then, the information transmission section 73 sends printer information to the host A 1 (step S455). If there is stored no other-apparatus information, the information transmission section 73 sends empty information to the host A 1. The aforementioned printer information includes the other-apparatus information acquired at the aforementioned step S152. Also, the printer information may include information about the multifunction peripheral A 6 which is the own apparatus.

The information acquiring section 63 in the printer driver 61 receives the printer information from the multifunction peripheral A 6 (step S403) and the acquired information is supplied to the distributed-processing determination section 64. The distributed-processing determination section 64 first determines whether or not the acquired printer information is empty information and also determines whether or not distributed processing should be performed from the acquired printer information for efficiently performing processing (step S404).

Then, if it is determined that tandem processing should be performed, a tandem printer is selected and information about the selected tandem printer is displayed on the tandem-printer indicating section 95 on the printing setting screen.

If the printer driver 61 detects that the OK button 99 has been pushed on the printing setting screen in FIG. 9, the distributed-processing determination section 64 finally determines the printer for use in printing processing (step S405). Further, the printer driver 61 creates print data to be transferred to the printers as required. However, in the case of filing jobs, the printer driver 61 only generates a command for printing, but does not create print data, since print data has been already created. The commanding section 65 sends a printing command to the printers which were finally selected according to the determination by the distributed-processing determination section 64. Further, the printer driver 61 transfers print data to the printers and causes the transfer-destination printers to perform printing processing, as required. For example, if the operator selects the multifunction peripheral A 6 and the distributed-processing determination section 64 selects the multifunction peripheral B 7 as the tandem printer, the commanding section 65 sends printing commands to both the multifunction peripheral A 6 and the multifunction peripheral B 7 (step S406). On the other hand, if the distributed-processing determination section 64 determines that tandem printing should not be performed and, thus, only the multifunction peripheral A 6 selected by the operator is used for printing, the commanding section 65 sends a printing command only to the multifunction peripheral A 6 (step S407).

Fourth Embodiment

In the present embodiment, there will be described an exemplary case where the multifunction peripheral A 6 which is an image forming apparatus includes the aforementioned other-apparatus information inputting section 75 and the aforementioned authentication processing section 76. Further, it is assumed that the multifunction peripheral A 6 includes the position determination section 77.

In order to cause the operator to input other-apparatus information, it is possible to cause him or her to input it to the operation section 34 in the multifunction peripheral A 6 illustrated in FIG. 2. Alternatively, it is possible to cause the operator to input other-apparatus information on the host A 1 by using the keyboard 57 and the display 56 in the host A 1 which is connected to the multifunction peripheral A 6 through the network A 9. In order to realize inputting of other-apparatus information from the host A1, for example, the other-apparatus information inputting section 75 can display a webpage on the host A 1. Also, the same web page can be displayed on the display section of the multifunction peripheral A 6 to enable inputting from the operation section 34 of the multifunction peripheral A 6. With the aforementioned structure, the host A 1 and the user interface can made consistent with each other. However, the structure of the other-apparatus information inputting section 75 is not limited to the aforementioned structure.

Next, there will be described an exemplary operation procedure until the setting of other-apparatus information through the operation panel of the image forming apparatus.

Figure 15:
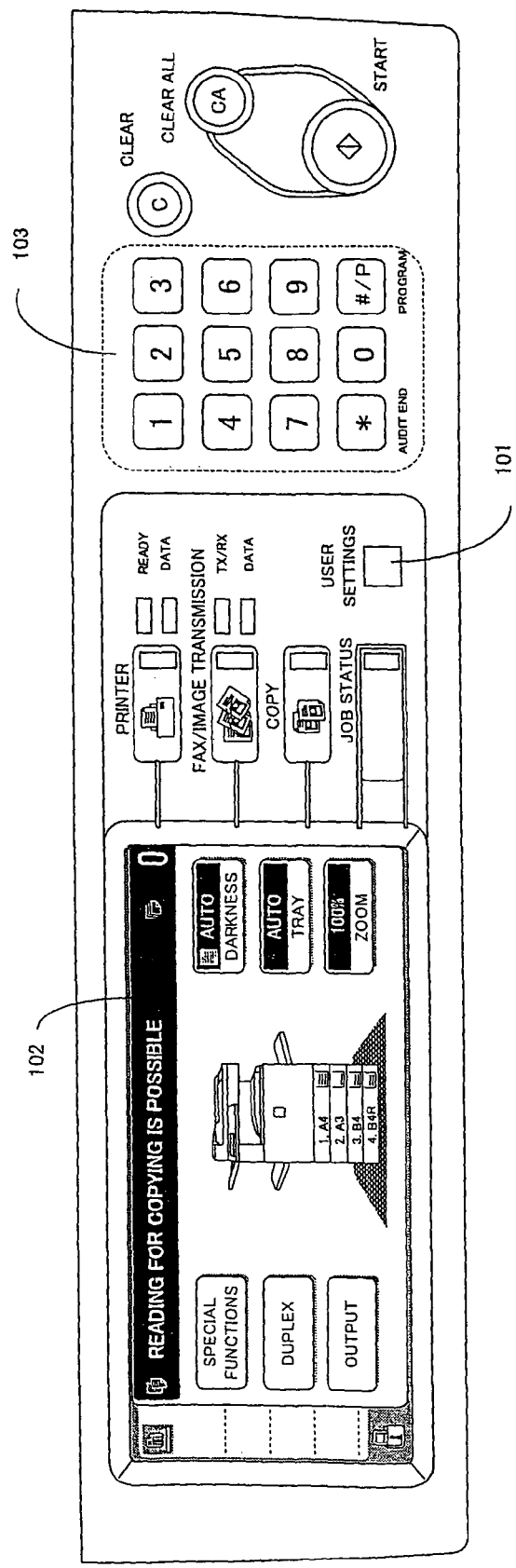
FIG. 15 is an explanation view illustrating an exemplary display on the operation panel of the image forming device.

FIG. 15 is an explanation view illustrating an exemplary display on the operation panel of the image forming apparatus. If the operator pushes a "user settings" key 101 on the operation panel illustrated in FIG. 15, the apparatus control section 33 shifts the display screen displayed on the liquid crystal display section 102 of the operation panel to a user setting screen.

Figure 16:
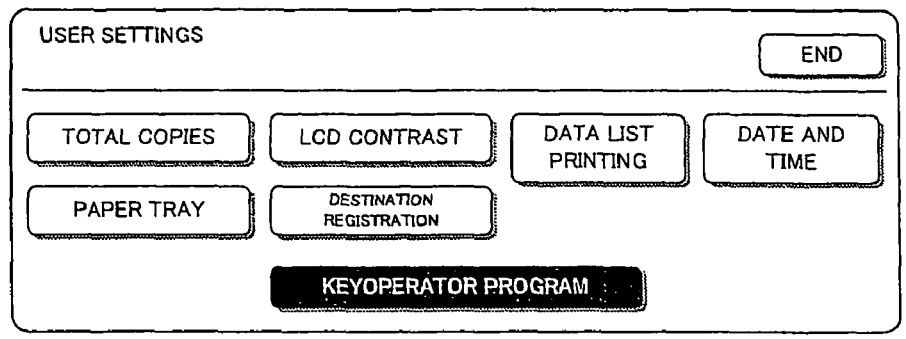
FIG. 16 is an explanation view illustrating a user setting screen displayed on the liquid crystal display section 102 in FIG. 15.

FIG. 16 is an explanation view illustrating an exemplary user setting screen displayed on the liquid crystal display section 102 of FIG. 15. The liquid crystal display section 102 includes a touch panel and, if the operator touches the screen, then the touch panel determines that the operator is pushing the key displayed at the section he or she touches. If the operator touches a "key operator program" key on the user setting screen of FIG. 16, then the "key operator program" key is temporarily displayed in a white-to-black reversed manner and then the screen is shifted to a key operator program screen to wait for inputting of a key operator code.

Figure 17:
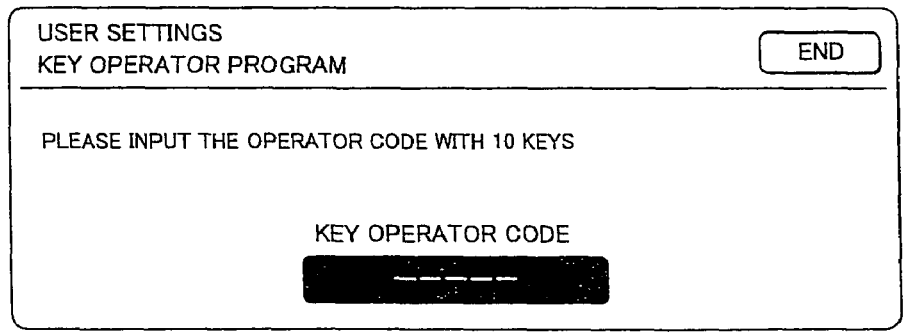
FIG. 17 is an explanation view illustrating an exemplary key operator program screen displayed on the liquid crystal display section 102 in FIG. 15.
Figure 18:
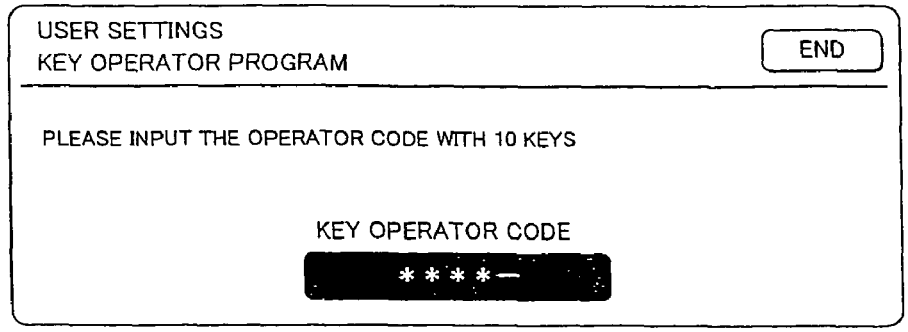
FIG. 18 is an explanation view illustrating the key operator program screen in FIG. 15 at a state where the upper four figures of an authentication code consisting of five figures have been input with ten keys.

FIG. 17 is an explanation view illustrating an exemplary key operator program screen displayed on the liquid crystal display section 102 in FIG. 15. On the screen of FIG. 17, the operator inputs, with ten keys on the operation panel, code information identical to a key operator program code which has been registered beforehand as an authentication code. The code information is input by the use of "0" to "9" keys in the ten keys 103 in FIG. 15. FIG. 18 is an explanation view illustrating an exemplary screen displayed during inputting of the authentication code. FIG. 18 illustrates a state where the upper four figures of an authentication code consisting of five figures have been input with the ten key. However, the method for inputting code information is not limited to the aforementioned method. For example, the multifunction peripheral A 6 may include an I/F for wireless communication such as the IrDA, and the operator can transmit, thereto, information required for authentication from a his or her portable information terminal device for requiring authentication. If correct code information is input thereto and, thus, the operator is authenticated as a manager, the multifunction peripheral A 6 displays a screen which enables selecting items settable as a key operator program.

Figure 19:
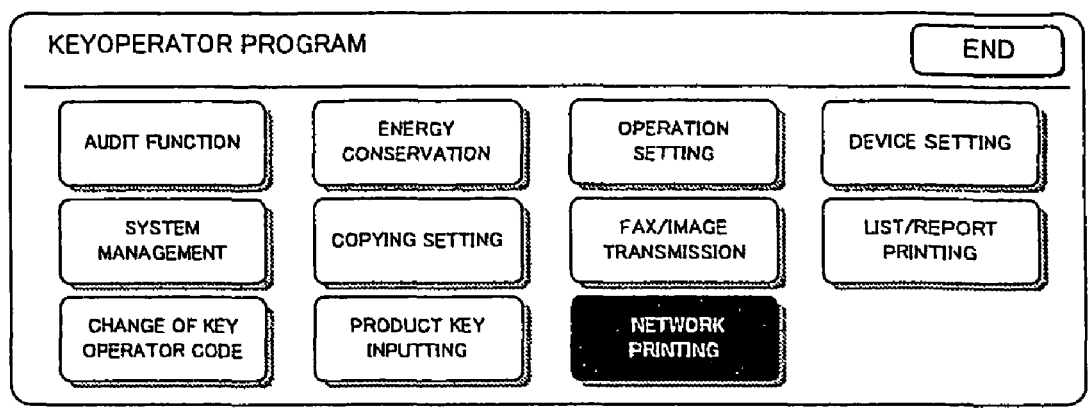
FIG. 19 is an explanation view illustrating an exemplary setting-item selection screen displayed on the liquid crystal display section 102 in FIG. 15.

FIG. 19 is an explanation view illustrating an exemplary setting-item selection screen displayed on the liquid crystal display section 102 of FIG. 15. The operator touches the keys indicative of items which he or she intends to set as a manager, from the displayed setting items. FIG. 19 illustrates a state where the operator has touched a "network printing setting" key. Since the "network printing setting" has been selected, the selected key is displayed in a white-to-black inversed manner and, thereafter, the display screen is shifted to a network printing setting screen.

Figure 20:
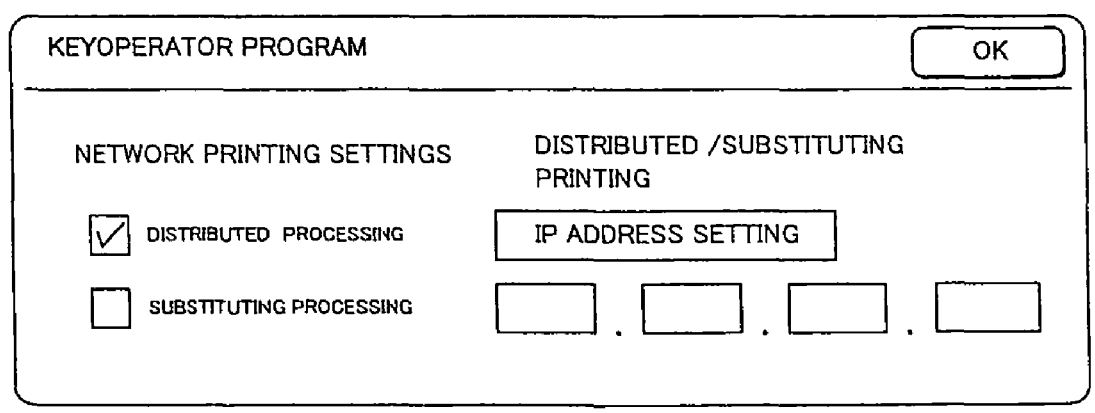
FIG. 20 is an explanation view illustrating an exemplary network printing setting screen displayed on the liquid crystal display section 102 in FIG. 15.

FIG. 20 is an explanation view illustrating an exemplary network printing setting screen displayed on the liquid crystal display section 102 of FIG. 15. This screen enables permitting the tandem processing function or the substituting printing processing function. The manager can change the setting according to the environment of the network on which the apparatus is installed. Further, this screen enables setting the IP address of the other image forming apparatus to be used for tandem processing or substituting processing.

Further, the screen which has been described enables setting only the IP address as other-apparatus information. Other other-apparatus information can be acquired from the other apparatus having the set IP address by communicating with the apparatus. However, the method for setting other-apparatus information is not limited to the aforementioned method, and other items may be set on the setting screen.

Figure 6:
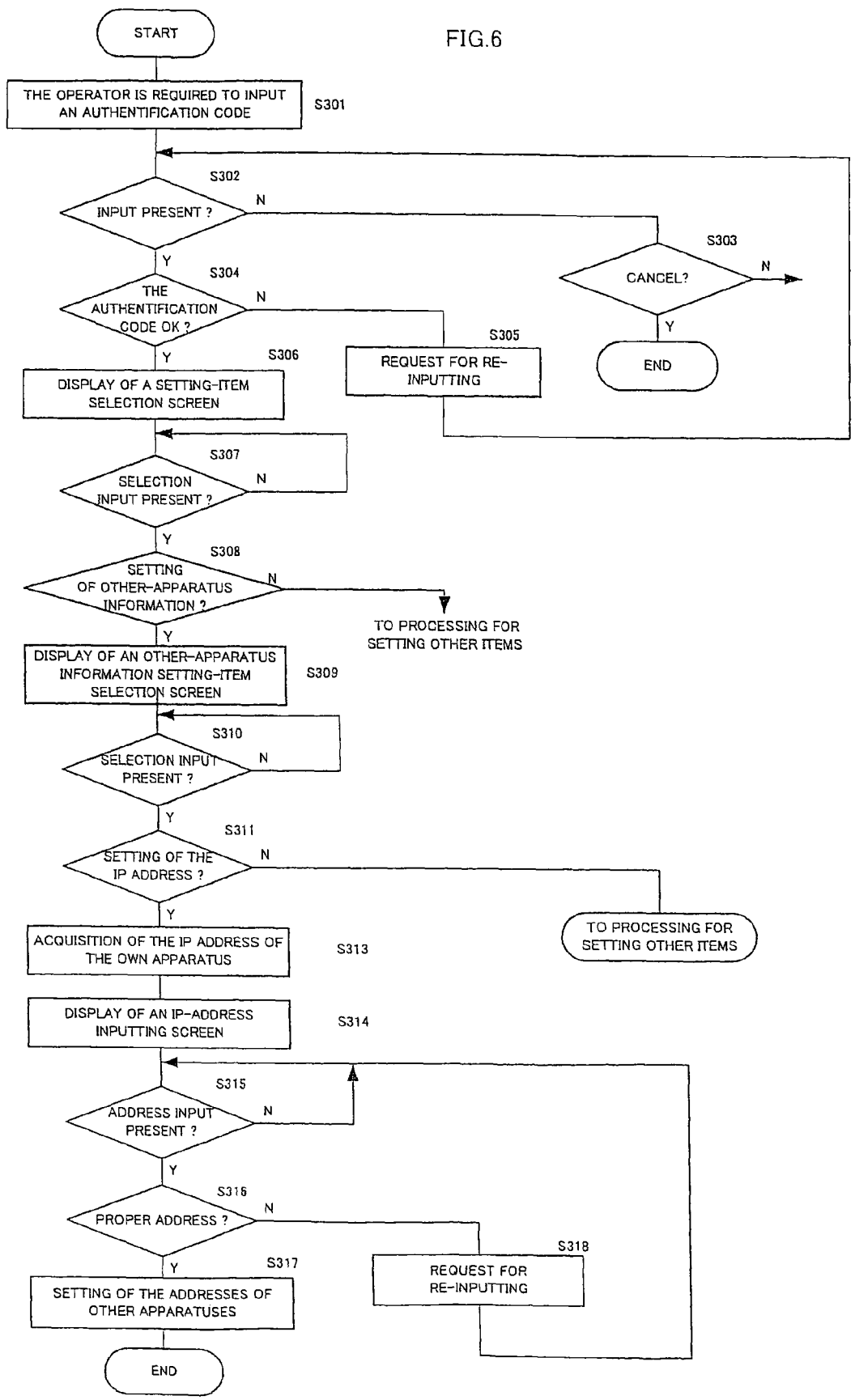
FIG. 6 is a flow chart illustrating a processing procedure which is executed by the other-apparatus information inputting section 75 and the authentication processing section 76 in the multifunction peripheral A 6 illustrated in FIG. 1.

FIG. 6 is a flow chart illustrating a processing procedure which is executed by the other-apparatus information inputting section 75 and the authentication processing section 76 in the multifunction peripheral A 6 in FIG. 1. Hereinafter, there will be described an exemplary case where the operator is caused to input other-apparatus information through the operation section 34 of the multifunction peripheral A 6. It is preferable that only certain operators such as a network manager or a key operator for the multifunction peripheral are allowed to input other-apparatus information, instead of allowing an unspecified number of people to input other-apparatus information. Accordingly, in the present embodiment, when inputting of other-apparatus information is received, the operator is required to input an authentication code for authentication, prior to inputting.

Figure 10:
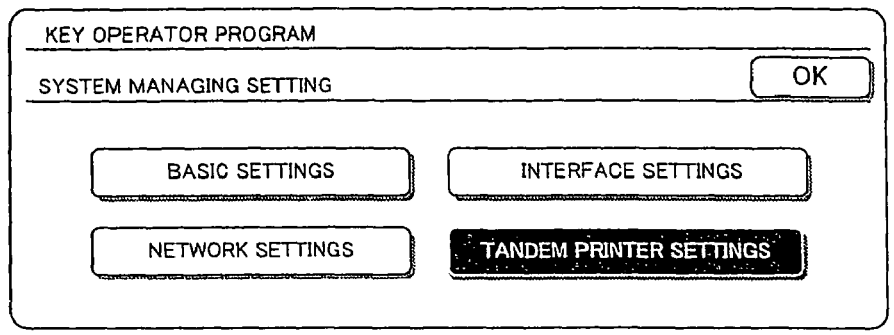
FIG. 10 is an explanation view illustrating an exemplary setting-item selection screen in the multifunction peripheral A 6 in FIG. 1.

In inputting other-apparatus information, the operator is required to input a predetermined authentication code by operating the operation section 34 of the multifunction peripheral A 6. If the operator attempts to enter a menu screen of the key operator program, the authentication processing section 76 causes the display section 34b to display a screen which requires a key-operator authentication code (step S301). Then, the authentication processing section 76 waits for an authentication code input by the operator (step S302). FIG. 17 illustrates an exemplary screen which requires an authentication code. On the screen of FIG. 17, if an "end" button is pushed to cancel the operation (step S303), the authentication processing is interrupted and ended. If an authentication code is input thereto, the authentication processing section 76 determines whether or not the input authentication code is correct (step S304). If a wrong authentication code is input, the authentication processing section 76 requires the operator to input an authentication code again (step S305). On the other hand, if a correct authentication code was input at the aforementioned step S304, the other-apparatus information inputting section 75 displays a setting-item selection screen (step S306). Then, it waits for selection of setting items by the operator (step S307). FIG. 10 is an explanation view illustrating an exemplary setting-item selection screen in the multifunction peripheral A 6 in FIG. 1. If a "tandem-printer setting" button is selected on the screen of FIG. 10 (step S308), then an inputting screen which causes the operator to select other-apparatus information inputting items is displayed (step S309). If other items are selected, processing for inputting other setting items is conducted.

Figure 11:
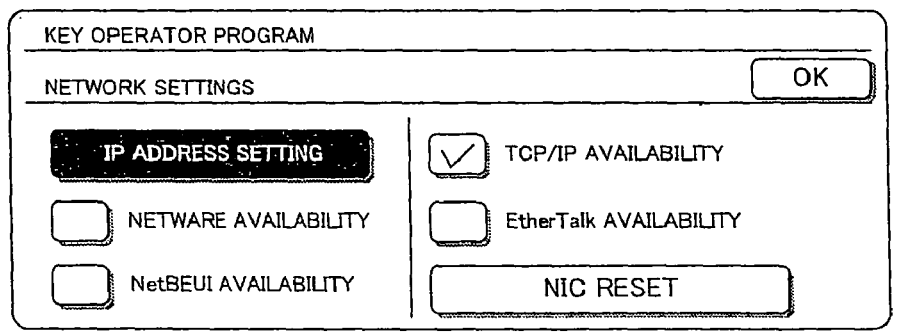
FIG. 11 is an explanation view illustrating an exemplary other-apparatus information setting-item selection screen in the multifunction peripheral A 6 in FIG. 1.

If an other-apparatus information inputting item is selected at the aforementioned step S308, the other-apparatus information inputting section 75 displays a selection screen which causes the operator to select other-apparatus information setting items (step S310). FIG. 11 is an explanation view illustrating an exemplary selection screen. If an "IP-address setting" button is selected on the screen of FIG. 11 (step S311), the other-apparatus information inputting section 75 acquires the setting of the IP address of the other apparatus (step S313). Then, the other-apparatus information inputting section 75 displays an inputting screen which causes the operator to select IP-address inputting items for a tandem printer (step S314). The setting of the IP address of the other apparatus acquired at the step S313 may be displayed on the inputting screen. If an item other than the IP-address setting item is selected at the step S311, processing for the other setting item is conducted.

Figure 12:
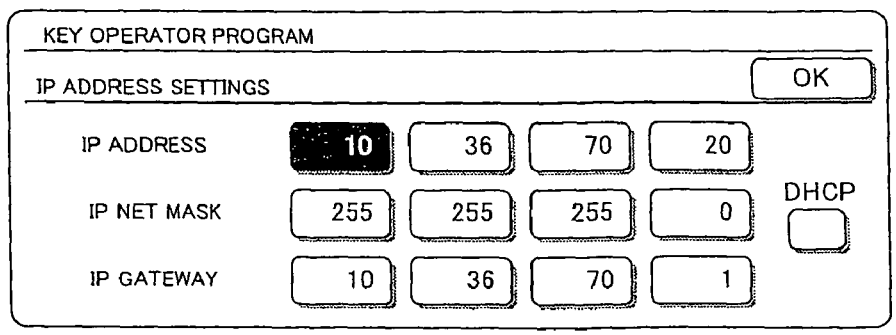
FIG. 12 is an explanation view illustrating an exemplary screen which causes an operator to input an IP address as other-apparatus information, in the multifunction peripheral A 6 in FIG. 1.

On the other hand, if the IP address setting for a tandem printer is selected at the step S311, the other-apparatus information inputting section 75 displays a screen which causes the operator to input the IP address as other-apparatus information. Then, the other-apparatus information inputting section 75 waits for inputting of the IP address of a tandem printer thereto (step S315). FIG. 12 is an explanation view illustrating an exemplary screen which causes the operator to input an IP address as other-apparatus information. When an IP address has been input, the position determination section 77 determines whether or not the input IP address is a proper address, in composition with the IP address of the own apparatus which was acquired at the step S313 (step S316).

For example, if the input IP address is overlapped with the IP address of the own apparatus, the input IP address is determined to be an improper IP address. For example, if the upper address masked with a subnet mask is different from the IP address of the own apparatus, the input IP address is determined to be an improper IP address which is not connected to a predetermined network. This determination offers the function of the position determination section 77 illustrated in FIG. 1.

If the position determination section 77 determines that the IP address is proper, the other-apparatus information inputting section 75 stores the input IP address in the other-apparatus information storage section 72 (step S317). On the other hand, if the position determination section 77 determines that the IP address is not proper, the other-apparatus information inputting section 75 requires the operator to input an IP address again (step S318).

Fifth Embodiment

In the present embodiment, the procedure for acquiring other-apparatus information will be described in more detail.

Figure 13:
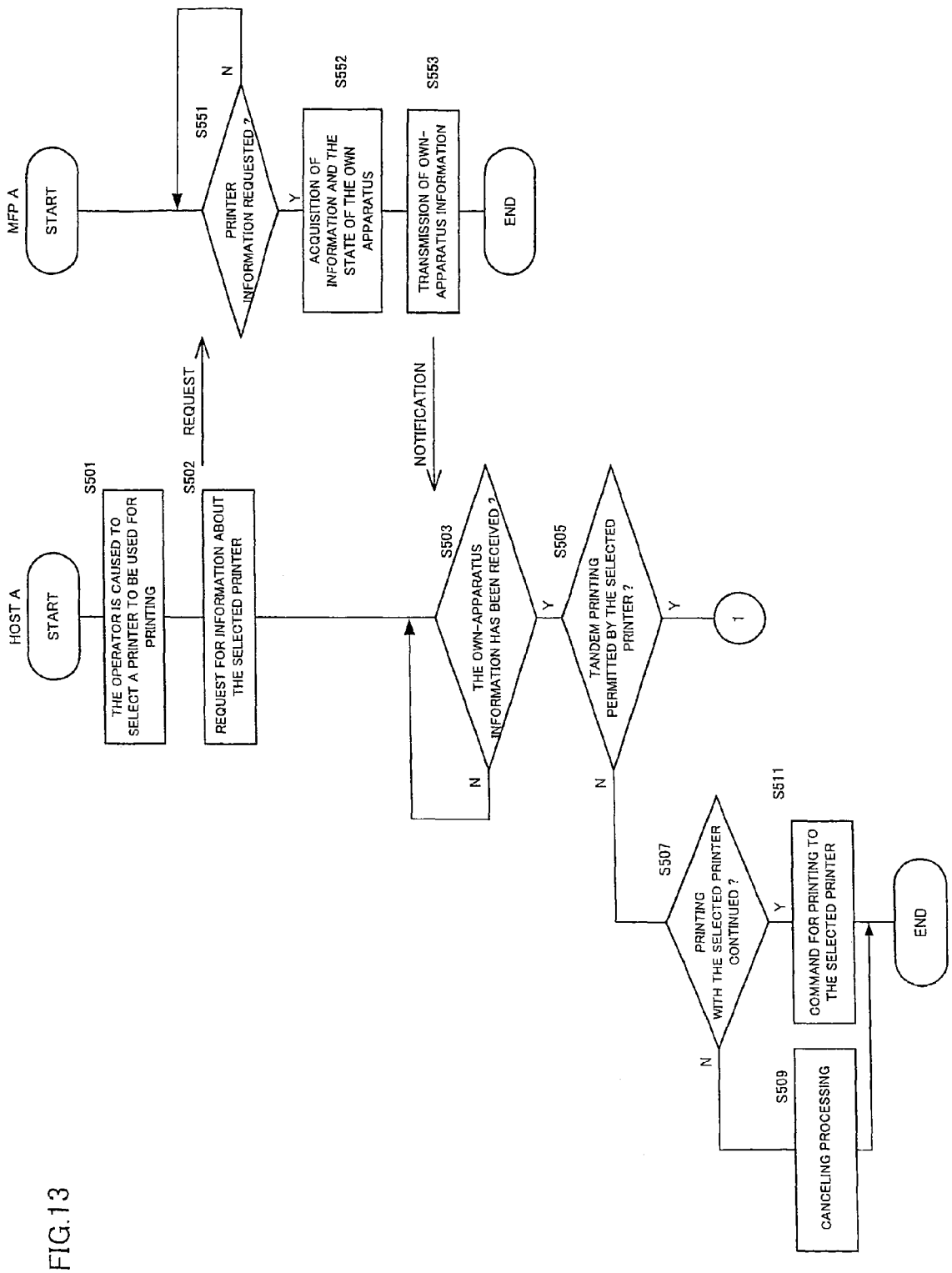
FIG. 13 is a flow chart illustrating a further different processing procedure which is executed by the printer driver 61 in the host A 1 and the multifunction peripheral A 6 illustrated in FIG. 1.
Figure 14:
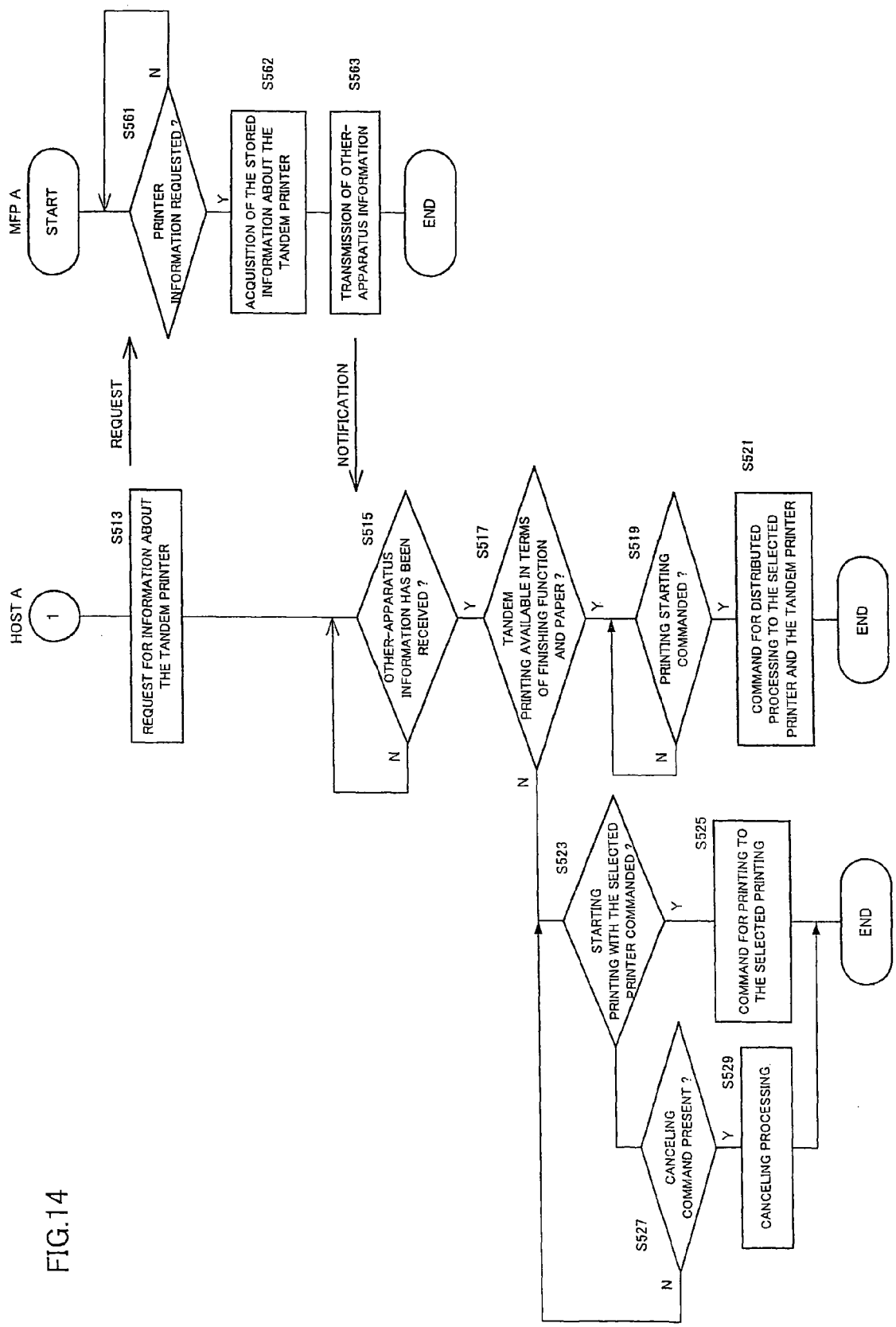
FIG. 14 is a flow chart illustrating a further different processing procedure which is executed by the printer driver 61 in the host A 1 and the multifunction peripheral A 6 illustrated in FIG. 1.

FIGS. 13 and 14 are flow charts illustrating a different procedure which is executed by the printer driver 61 in the host A 1 and the multifunction peripheral A 6 in FIG. 1. The printer driver 61 causes the operator to select a printer to be used for printing, by inputting it to a setting screen (step S501).

When the printer has been selected, the information requiring section 62 makes a request to the multifunction peripheral A 6 selected through the drop-down menu 91 for information about the multifunction peripheral A6 (step 502). At this stage, the printer driver 61 acquires information about the multifunction peripheral A 6 which is the selected image forming apparatus, namely own-apparatus information, and refers to the information about whether or not the multifunction peripheral A 6 permits tandem processing. In the present embodiment, it is assumed that the command for requiring own-apparatus information is different from the command for requiring other-apparatus information. Accordingly, at the aforementioned step S502, the information requiring section 62 generates a command for requiring own-apparatus information. In cases where the command for requiring own-apparatus information and the command for requiring other-apparatus information are the same, the information requiring section 62 generates a command for requiring both own-apparatus information and other-apparatus information to acquire both the information, at the aforementioned step S502. Then, the acquired other-apparatus information is stored in the other-apparatus information storage section, thereby omitting the requirement of other-apparatus information at a step S513 which will be described later.

The multifunction peripheral A 6 monitors whether or not it has received a request for the printer state, from the hosts connected to the network 9 (step S551). On receiving a request for the printer information from the host A 1, the information transmission section 73 in the multifunction peripheral A 6 acquires information about the multifunction peripheral A 6, namely own-apparatus information (step S552) and sends printer information to the host A 1 (step S553). An exemplary content of the own-apparatus information is illustrated in FIG. 8. The respective items in the own-apparatus information correspond to the items of the other-apparatus information.

The information acquiring section 63 in the printer driver 61 waits for reception of the own-apparatus information from the multifunction peripheral A 6 (step S503). On receiving the own-apparatus information, it is confirmed whether or not the multifunction peripheral A 6 permits tandem processing (step S505). If the multifunction peripheral A 6 does not permit tandem processing, the routine proceeds to a step S507. In this case, the printer driver 61 indicates this fact on a driver screen and causes the user to select continuing or canceling of printing (step S507). If canceling is selected, the printer driver 61 executes processing for canceling the printing (step S509) and then ends the processing. On the other hand, if continuing is selected, the printer driver 61 commands the multifunction peripheral A 6 to solely perform printing (step S511) and ends the processing. On receiving the command, the multifunction peripheral A 6 performs printing solely.

If the multifunction peripheral A 6 permits tandem processing at the step S505, the routine proceeds to a step S513. In this case, the information requiring section 62 makes a request to the multifunction peripheral A 6 for other-apparatus information (step S513).

The multifunction peripheral A 6 continuously monitors whether or not it has received a request for the printer information, from the host A 1 (step S561). On receiving a request for the printer information from the host A 1, the information transmission section 73 in the multifunction peripheral A 6 acquires information about the tandem printer which is stored in the other-apparatus information storage section 72, namely other-apparatus information (step S562). Then, it sends printer information to the host A 1 (step S563). If there is registered no information about other-apparatuses, the information transmission section 73 sends empty information to the host A 1.

The information acquiring section 63 in the printer driver 61 receives the other-apparatus information from the multifunction peripheral A 6 (step S515) and the acquired information is supplied to the distributed-processing determination section 64. The distributed-processing determination section 64 determines whether or not the acquired other-apparatus information is empty information and also determines whether or not distributed processing is available, on the basis of the other-apparatus information (step S517).

The determination as to whether or not distributed processing is available can be performed, for example, on the basis of whether or not the "state" in the other-apparatus information as illustrated in FIG. 8 is standby state. Further, if paper of the type to be used for printing is not mounted in any of the trays, it can be determined that distributed processing is not available for printing. Further, in the case of double-side printing, if "double-side" is set to be "unavailable", it can be determined that distributed processing is unavailable for printing. In the case of using a post-processing function, "post-processing" is referred to and, if the post-processing function to be used is not available, it is determined that distributed processing is unavailable for printing If the distributed-processing determination section 64 determines that tandem processing should be performed, the printer driver 61 selects a tandem printer and displays information about the selected tandem printer on the tandem-printer indicating section 95 on the printing setting screen.

If the distributed-processing determination section 64 detects that the OK button 99 has been pushed on the printing setting screen in FIG. 9 (step S159), the distributed-processing determination section 64 finally determines the printer for use in printing processing (step S405). Further, the printer driver 61 creates print data to be transferred to the printers as required. The commanding section 65 sends a printing command to the image forming device which was finally selected according to the determination by the distributed-processing determination section 64 (step S521) and causes the transfer-destination printer to perform printing processing. For example, if the operator selects the multifunction peripheral A 6 and the distributed-processing determination section 64 selects the multifunction peripheral B 7 as the tandem printer, the commanding section 65 sends printing commands to both the multifunction peripheral A 6 and the multifunction peripheral B 7.

On the other hand, if the distributed-processing determination section 64 determines at the step S517 that tandem processing should not be performed, only the multifunction peripheral A 6 is used for printing processing. In this case, the routine proceeds to a step S523 where it is determined whether or not the OK button 99 or the canceling button 98 has been pushed on the printing setting screen of FIG. 9.

If it is determined that the OK button has been pushed and, therefore, a printing starting command has been generated (step S523), the commanding section 65 sends a printing command to the multifunction peripheral A 6 (step S525) to cause it to perform printing processing and, thereafter, ends the processing. If it is determined that the canceling button 98 has been pushed (step S527), canceling processing is performed (step S529) and the processing ends.

It is apparent that many variations and modifications may be made to the present invention, in addition to the aforementioned embodiments. It should be understood that all such modifications and variations are intended to be included herein within the spirit and scope of the claims of the present invention. It should be apparent to those skilled in the art that such modifications and variations are intended to be included within the scope of the claims of the present invention.

What is claimed is:

1. An image forming system providing a plurality of image forming apparatuses and a processing controller for selecting at least one of the apparatuses and causing the selected apparatus to perform image formation, the plurality of image forming apparatuses and the processing controller being connected to one another through a network, wherein each of the image forming apparatuses comprises an other-apparatus information storage section for storing information about one or more other image forming apparatuses as other-apparatus information, said other-apparatus information including fixed information and state information relative to the respective one or more other image forming apparatuses, wherein the state information is varied depending upon the utilization condition of the corresponding other image-forming apparatus and the fixed information is not varied depending upon the utilization condition of the corresponding other image-forming apparatus, and the selected image-forming apparatus comprises an other-apparatus information inputting section for inputting the fixed information, and the processing controller comprises:

an information acquiring section for acquiring the other-apparatus information stored in the other-apparatus information storage section of the selected apparatus through the network;

a distributed-processing determination section for determining at least one of the one or more other apparatuses to be used for image formation in cooperation with the selected apparatus or determining that only the selected apparatus should be used for image formation, on the basis of the acquired other-apparatus information; and a commanding section for commanding the corresponding image forming apparatus(es) to perform the image formation, on the basis of the determination made by the distributed-processing determination section.

2. The image forming system of claim 1, wherein the selected image forming apparatus further comprises an other-apparatus information acquiring section for acquiring the state information about the one or more other image forming apparatuses from the one or more other apparatuses through the network, and for storing the acquired state information in the other-apparatus information storage section or updating the state information.

3. The image forming system of claim 1, wherein the other-apparatus information includes a current state of the one or more other apparatuses.

4. A printer driver program to be installed in a processing controller for selecting a single image forming apparatus from a plurality of image forming apparatuses, each image forming apparatus and the processing controller being connected to one another through a network, and for commanding the selected apparatus to perform image formation, the printer driver program causing the processing controller to function as:

an information acquiring section for acquiring other-apparatus information from the selected apparatus which stores information about one or more other image forming apparatus as other-apparatus information;

said other-apparatus information including fixed information and state information relative to the respective one or more other image forming apparatuses, wherein the state information is varied depending upon the utilization condition of the corresponding other image-forming apparatus and the fixed information is not varied depending upon the utilization condition of the corresponding other image-forming apparatus, and the selected image-forming apparatus comprises an other-apparatus information inputting section for inputting the fixed information, and a distributed-processing determination section for determining at least one of the one or more other apparatuses to be used for image formation in cooperation with the selected apparatus or determining that only the selected apparatus should be used for image formation, on the basis of the acquired other-apparatus information; and a commanding section for commanding the corresponding image forming apparatus(es) to perform the image formation, on the basis of the determination made by the distributed-processing determination section.

5. The printer driver program of claim 4, wherein the information acquiring section acquires an image-formation processing speed of the one or more other apparatuses as the other-apparatus information, and the distributed-processing determination section makes its determination on the basis of the acquired image- formation processing speed.

6. The printer driver program of claim 4, wherein the information acquiring section acquires an installation position of the one or more other apparatuses as the other-apparatus information, and the distributed-processing determination section makes its determination on the basis of the acquired installation position.

7. The printer driver program of claim 4, wherein the information acquiring section further acquires information about whether or not the selected apparatus is in a state capable of image formation, and the processing controller further comprises a substitute-apparatus selecting section for selecting at least one of the one or more other apparatuses to be substitutionally used for image formation when the selected apparatus is not in the state capable of image formation.

8. The printer driver program of claim 4, wherein the information acquiring section further acquires information on the selected apparatus.

9. An image forming apparatus comprising:

a network connecting section for receiving a command for image formation from a processing controller which is connected to the image forming apparatus through a network;

an other-apparatus information storage section for storing information about one or more other image forming apparatuses which are connected to the image forming apparatus through the network as other-apparatus information;

said other-apparatus information including fixed information and state information relative to the respective one or more other image forming apparatuses, wherein the state information is varied depending upon the utilization condition of the corresponding other image-forming apparatus and the fixed information is not varied depending upon the utilization condition of the corresponding other image-forming apparatus, and the selected image-forming apparatus comprises an other-apparatus information inputting section for inputting the fixed information, and an information transmission section for transmitting the stored other-apparatus information to the processing controller; and an image forming section for performing image forming processing in response to the received command.

10. The image forming apparatus of claim 9, further comprising an other-apparatus information acquiring section for acquiring the state information about the one or more other image forming apparatuses from the one or more other apparatuses through the network and for storing the acquired state information in the other-apparatus information storage section or updating the state information.

11. The image forming apparatus of claim 9, further comprising an authentication processing section for performing operator authentication processing prior to the inputting from the other-apparatus information inputting section.

12. The image forming apparatus of claim 9, wherein the network includes a predetermined network therein, and the apparatus further comprises a position determination section for determining whether or not the one or more other apparatuses are placed within the predetermined network prior to the storing of the other-apparatus information in the other-apparatus information storage section.

13. The image forming apparatus of claim 9, wherein the information transmission section transmits only the other-apparatus information about the one or more other apparatuses which are in a state capable of image formation.

14. The image forming apparatus of claim 9, wherein the information transmission section further transmits information about the image forming apparatus.

* * * * *